(12) United States Patent
Hagiwara et al.

(10) Patent No.: US 11,428,177 B2
(45) Date of Patent: Aug. 30, 2022

(54) ENGINE DEVICE

(71) Applicant: YANMAR POWER TECHNOLOGY CO., LTD., Osaka (JP)

(72) Inventors: Ryoichi Hagiwara, Osaka (JP); Kazuteru Toshinaga, Osaka (JP); Masayoshi Doi, Osaka (JP); Taishi Murakami, Osaka (JP); Tatsuro Ohsara, Osaka (JP); Osamu Yamagishi, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 17/389,474

(22) Filed: Jul. 30, 2021

(65) Prior Publication Data
US 2021/0355886 A1 Nov. 18, 2021

Related U.S. Application Data

(63) Continuation of application No. 16/884,171, filed on May 27, 2020, now Pat. No. 11,111,866, which is a
(Continued)

(51) Int. Cl.
*F02D 41/00* (2006.01)
*F02D 19/06* (2006.01)
(Continued)

(52) U.S. Cl.
CPC ..... *F02D 41/0027* (2013.01); *F02D 19/0615* (2013.01); *F02D 19/0618* (2013.01);
(Continued)

(58) Field of Classification Search
CPC ............. F02D 41/0027; F02D 19/0615; F02D 19/0618; F02D 19/0642; F02D 19/0657;
(Continued)

(56) References Cited

U.S. PATENT DOCUMENTS

| | | | |
|---|---|---|---|
| 4,440,137 A | 4/1984 | Lagano et al. | |
| 4,513,727 A | 4/1985 | Lagano et al. | |

(Continued)

FOREIGN PATENT DOCUMENTS

| | | |
|---|---|---|
| EP | 2000652 A1 | 12/2008 |
| JP | 1984-052054 U | 4/1984 |

(Continued)

OTHER PUBLICATIONS

International Search Report dated Aug. 30, 2016 issued in corresponding PCT Application PCT/JP2016/065253.

(Continued)

*Primary Examiner* — Joseph J Dallo
(74) *Attorney, Agent, or Firm* — Norton Rose Fulbright US LLP

(57) ABSTRACT

An engine device including an intake manifold configured to supply air into a cylinder; an exhaust manifold configured to output exhaust gas from the cylinder; a gas injector which mixes a gaseous fuel with the air supplied from the intake manifold; and a main fuel injection valve configured to inject a liquid fuel into the cylinder for combustion. At the time of switching from a gas mode in which the gaseous fuel is supplied into the cylinder to a diesel mode in which the liquid fuel is supplied into the cylinder, a supply-start timing of the liquid fuel is delayed relative to a supply-stop timing of the gaseous fuel.

3 Claims, 19 Drawing Sheets

Related U.S. Application Data continuation of application No. 15/760,169, filed as application No. PCT/JP2016/065253 on May 24, 2016, now Pat. No. 10,690,069.

(51) Int. Cl.

| | | |
|---|---|---|
| *F02D 41/30* | (2006.01) | |
| *F02D 19/10* | (2006.01) | |
| *F02D 41/40* | (2006.01) | |
| *F02D 29/02* | (2006.01) | |
| *B63H 21/14* | (2006.01) | |

(52) U.S. Cl.
CPC ..... *F02D 19/0642* (2013.01); *F02D 19/0657* (2013.01); *F02D 19/0686* (2013.01); *F02D 19/105* (2013.01); *F02D 29/02* (2013.01); *F02D 41/0025* (2013.01); *F02D 41/3047* (2013.01); *F02D 41/3064* (2013.01); *F02D 41/401* (2013.01); *B63H 21/14* (2013.01); *F02D 2200/101* (2013.01); *Y02T 10/30* (2013.01); *Y02T 10/40* (2013.01)

(58) Field of Classification Search
CPC .... F02D 19/0686; F02D 19/105; F02D 29/02; F02D 41/0025; F02D 41/3047; F02D 41/3064; F02D 41/401; F02D 2200/101; F02D 2200/701; F02D 19/0613; F02D 41/3094; F02D 41/345; B63H 21/14; Y02T 10/30; Y02T 10/40; Y02T 70/5218
See application file for complete search history.

(56) References Cited

U.S. PATENT DOCUMENTS

| | | | |
|---|---|---|---|
| 6,009,860 A | 1/2000 | Brown et al. | |
| 2002/0007816 A1 | 1/2002 | Zur Loye et al. | |
| 2003/0187565 A1 | 10/2003 | Wong | |
| 2010/0332106 A1 | 12/2010 | Vanderslice et al. | |
| 2011/0213545 A1 | 9/2011 | Oaten et al. | |
| 2012/0318248 A1 | 12/2012 | Nakayama | |
| 2013/0179050 A1 | 7/2013 | Munshi et al. | |
| 2014/0174407 A1 | 6/2014 | Koppel et al. | |
| 2014/0238351 A1 | 8/2014 | Haas et al. | |
| 2014/0311451 A1 | 10/2014 | Fang et al. | |
| 2015/0068500 A1 | 3/2015 | Inoue et al. | |
| 2015/0204285 A1 | 7/2015 | Gruschow et al. | |
| 2015/0219023 A1 | 8/2015 | Kolhouse et al. | |
| 2016/0169141 A1 | 6/2016 | Flynn et al. | |
| 2016/0327464 A1 | 11/2016 | Rasmussen et al. | |
| 2016/0333807 A1 | 11/2016 | Pathan et al. | |
| 2017/0089273 A1 | 3/2017 | Thomas et al. | |
| 2018/0251194 A1 | 9/2018 | Takaishi et al. | |
| 2019/0040804 A1 | 2/2019 | Atterberry et al. | |

FOREIGN PATENT DOCUMENTS

| | | |
|---|---|---|
| JP | H07-034915 A | 2/1995 |
| JP | H08-004562 A | 1/1996 |
| JP | 2000-145488 A | 5/2000 |
| JP | 2002-004899 A | 1/2002 |
| JP | 2003-262139 A | 9/2003 |
| JP | 2013-241905 A | 12/2013 |
| JP | 2014-132171 A | 7/2014 |
| JP | 2015-017594 A | 1/2015 |
| JP | 2015-052302 A | 3/2015 |
| WO | 2003/081009 A1 | 10/2003 |
| WO | 2011/117960 A1 | 9/2011 |
| WO | 2014/073154 A1 | 5/2014 |

OTHER PUBLICATIONS

Korean Office Action dated Dec. 20, 2018 issued in corresponding KR Application 10-2018-7003520.
European Search Report dated Aug. 21, 2018 issued in corresponding EP Application 16846033.5.

ENGINE DEVICE

CROSS REFERENCES TO RELATED APPLICATIONS

This application is a continuation of U.S. patent application Ser. No. 16/884,171 filed May 27, 2020, which is a continuation of U.S. patent application Ser. No. 15/760,169, filed Mar. 14, 2018 (now U.S. Pat. No. 10,690,069), which is a national stage application pursuant to 35 U.S.C. § 371 of Int'l Pat. App. No. PCT/JP2016/065253, filed May 24, 2016, which claims priority under 35 U.S.C. § 119 to JP Pat. App. No. 2015-182481, filed Sep. 16, 2015, the disclosures of which are hereby incorporated by reference in their entireties.

DESCRIPTION

Technical Field

The present invention relates to an engine device of a multi-fuel adoptable type for both gaseous fuels such as natural gas and liquid fuels such as heavy oil.

Background Art

Traditionally, diesel engines are used as a drive source of vessels such as tankers or transport ships and onshore power generation facilities. However, the exhaust gas of the diesel engine contains a large amount of nitrogen oxides, sulfur oxides, particulate matter, and the like which are harmful substances hindering preservation of the environment. For this reason, in recent years, gas engines that can reduce the amount of harmful substances generated are becoming prevalent as an alternative engine for diesel engines.

A so-called gas engine that generates power by using a fuel gas such as natural gas supplies a mixed gas obtained by mixing a fuel gas with the air to a cylinder and combust the same (see Patent Literature 1; hereinafter PTL 1). Further, as an engine device combining the characteristics of a diesel engine and characteristics of a gas engine, there is a dual-fuel engine which allows a use of a premixed combustion mode in which a mixture of a gaseous fuel (fuel gas) such as natural gas and air is supplied to a combustion chamber and combusted, in combination with a diffusion combustion mode in which a liquid fuel such as crude oil is injected into the combustion chamber and combusted (see patent Literature 2; hereinafter, PTL 2).

Further, as a dual-fuel engine, a multifuel engine or a bi-fuel engine has been suggested which adjusts a gaseous fuel and a liquid fuel at a time of switching from a gas mode using the gaseous fuel to a diesel mode using the liquid fuel (see Patent Literature 3 and Patent Literature 4; hereinafter, referred to as PTL 3 and PTL 4, respectively). Further, as a dual-fuel engine, a bi-fuel internal combustion engine which restrains fuel shortage in cylinders by advancing the fuel injection timing immediately after switching, in a case of performing switching between a gaseous fuel and a liquid fuel as needed according to the operational state (see Patent Literature 5; hereinafter, PTL 5).

In cases of switching from the gas mode to the diesel mode in the dual-fuel engine, there is one that stops supplying of the gaseous fuel and starts supplying the liquid fuel at the same time, unlike PTL 3 and PTL 4. Since supply of the gaseous fuel is conducted in an air intake stroke while the supply of the liquid fuel is conducted in a compressing stroke, the gaseous fuel and the liquid fuel may be supplied at the same time into a single cylinder, depending on the timing of switching the operation from the gas mode to the diesel mode. Even if fuel injection timing advance control of PTL 5 is adopted, it only restrains fuel shortage in the cylinder and does not prevent excessive fuel supply at the time of switching from the gas mode to the diesel mode.

A large-size engine device for a ship, in particular, is required to operate in the diesel mode to sustain navigation of the ship in cases of emergency. However, when the gas mode is switched to the diesel mode in such an emergency, a traditional engine device may suspend its operation and stop the ship, due to abnormal combustion or an excessively high in-cylinder pressure caused by an excessive supply of the fuel into the cylinder, or due to misfire caused by insufficient fuel in the cylinder.

In view of the current circumstances described above, it is a technical object of the present invention to provide an improved multi-fuel adoptable type engine device.

CITATION LIST

PTL 1: Japanese Patent Application Laid-Open No. 2003-262139
PTL 2: Japanese Patent Application Laid-Open No. 2002-004899
PTL 3: Japanese Patent Application Laid-Open No. H08-004562 (1996)
PTL 4: Japanese Patent Application Laid-Open No. 2015-017594
PTL 5: Japanese Patent Application Laid-Open No. 2014-132171

SUMMARY OF INVENTION

An aspect of the present invention is an engine device including: an intake manifold configured to supply air into a cylinder; an exhaust manifold configured to output exhaust gas from the cylinder; a gas injector which mixes a gaseous fuel with the air supplied from the intake manifold; and a main fuel injection valve configured to inject a liquid fuel into the cylinder for combustion, the gas injector and the main fuel injection valve being provided to each of a plurality of the cylinders, wherein at a time of switching from a gas mode in which the gaseous fuel is supplied into the cylinder to a diesel mode in which the liquid fuel is supplied into the cylinder, a supply-start timing of the liquid fuel is delayed relative to a supply-stop timing of the gaseous fuel.

The above engine device may further include: an engine rotation sensor configured to measure an engine rotation number, wherein a delay period by which the supply-start timing of the liquid fuel is delayed relative to the supply-stop timing of the gaseous fuel is set based on the engine rotation number measured by the engine rotation sensor.

Further, the above engine device may be such that: the gaseous fuel is supplied in an air intake stroke in the gas mode, and the liquid fuel is supplied in a compressing stroke in the diesel mode, and the delay period is set longer than a period taken by the compressing stroke, but shorter than a period taken by the air intake stroke and the compressing stroke.

Further, the above engine device may be such that: the gaseous fuel is supplied in an air intake stroke in the gas mode, and the liquid fuel is supplied in a compressing stroke in the diesel mode, and after the gas mode is switched to the diesel mode, supply of the liquid fuel is started for the cylinder in the compressing stroke, only when confirmation is made that no gaseous fuel has been supplied to that cylinder in the immediately previous air intake stroke.

The above engine device may include an igniter configured to ignite, in the cylinder, a premixed fuel obtained by pre-mixing the gaseous fuel with the air, wherein the igniter is operated in both the gas mode and the diesel mode.

Further, the above engine device may include an igniter configured to ignite, in the cylinder, a premixed fuel obtained by pre-mixing the gaseous fuel with the air, wherein the igniter is operated in the gas mode, while the igniter is stopped in the diesel mode.

In the present invention, the start of supplying the liquid fuel (start of operation in the diesel mode) is delayed relative to the stop of supplying the gaseous fuel (stop of operation in the gas mode), at a time of switching from the gas mode to the diesel mode. Therefore, the engine device selectively supplies the gaseous fuel or the liquid fuel to each cylinder at the time of switching from the gas mode to the diesel mode, and can prevent the gaseous fuel supply and the liquid fuel supply from overlapping each other. Therefore, at the time of switching from the gas mode to the diesel mode, here will not be a case where both the gaseous fuel and the liquid fuel are supplied to a single cylinder, and it is possible to avoid an excessive supply of the fuel to the cylinder, and to prevent an excessively high in-cylinder pressure and abnormal combustion. Therefore, a stable operation is achieved.

In the present invention, the liquid fuel supply is enabled to start the diesel mode, when a cylinder having reached the timing of supplying the liquid fuel and having no gaseous fuel supplied therein is confirmed for the first time after the gaseous fuel supply is stopped. Thus, at a time of switching from the gas mode to the diesel mode, the gaseous fuel or the liquid fuel can be selectively supplied to the cylinder, while the time for switching over is minimized. Therefore, at the time of switching from the gas mode to the diesel mode, the gaseous fuel supply and the liquid fuel supply are not performed to a single cylinder in an overlapping manner, and it is possible to avoid an excessive supply of the fuel to the cylinder, and to prevent an excessively high in-cylinder pressure and abnormal combustion. Further, since it is possible to avoid a situation in which neither the gaseous fuel nor the liquid fuel is supplied to the cylinder at a time of switching from the gas mode to the diesel mode, misfire at the time of switching can be prevented, and a stable operation can be achieved.

DESCRIPTION OF EMBODIMENTS

The following description is based on drawings showing an application of an embodiment embodying the present invention to a pair of propulsion/electric power generating mechanisms mounted in a ship having a two-engine two-shaft structure.

Figure 1:
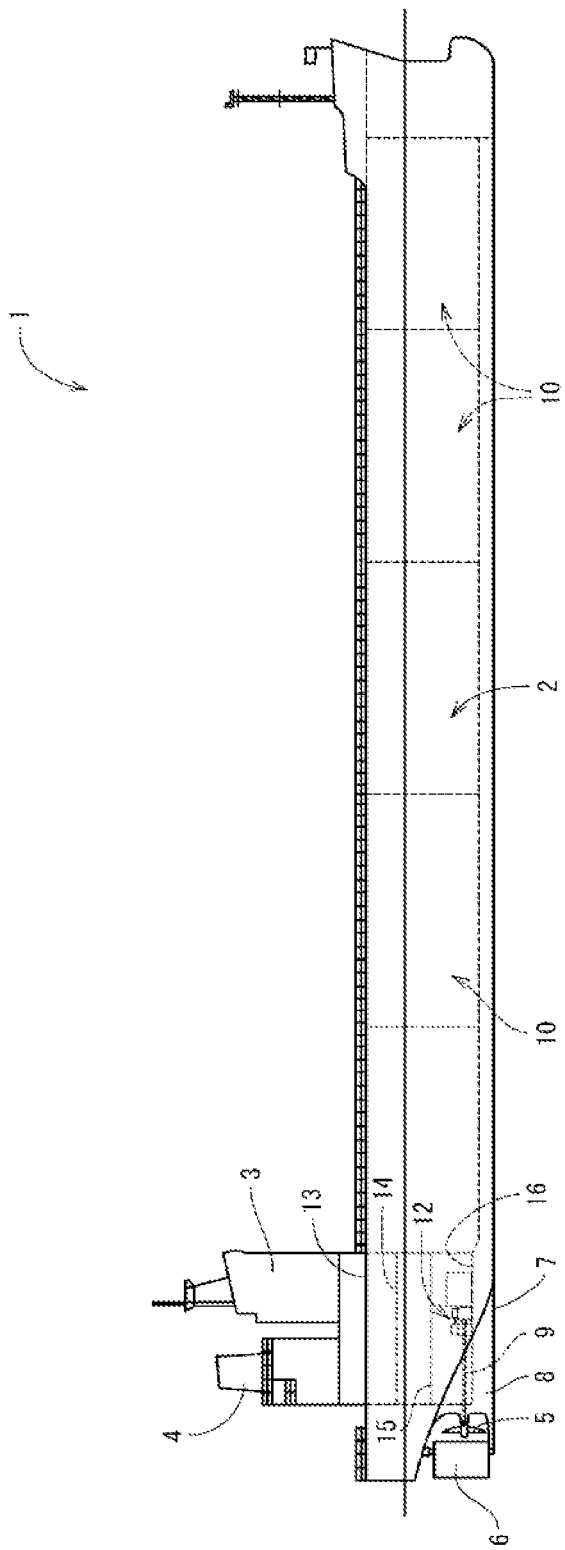
FIG. 1 illustrates an overall side view of a ship in an embodiment of the present invention.
Figure 2:
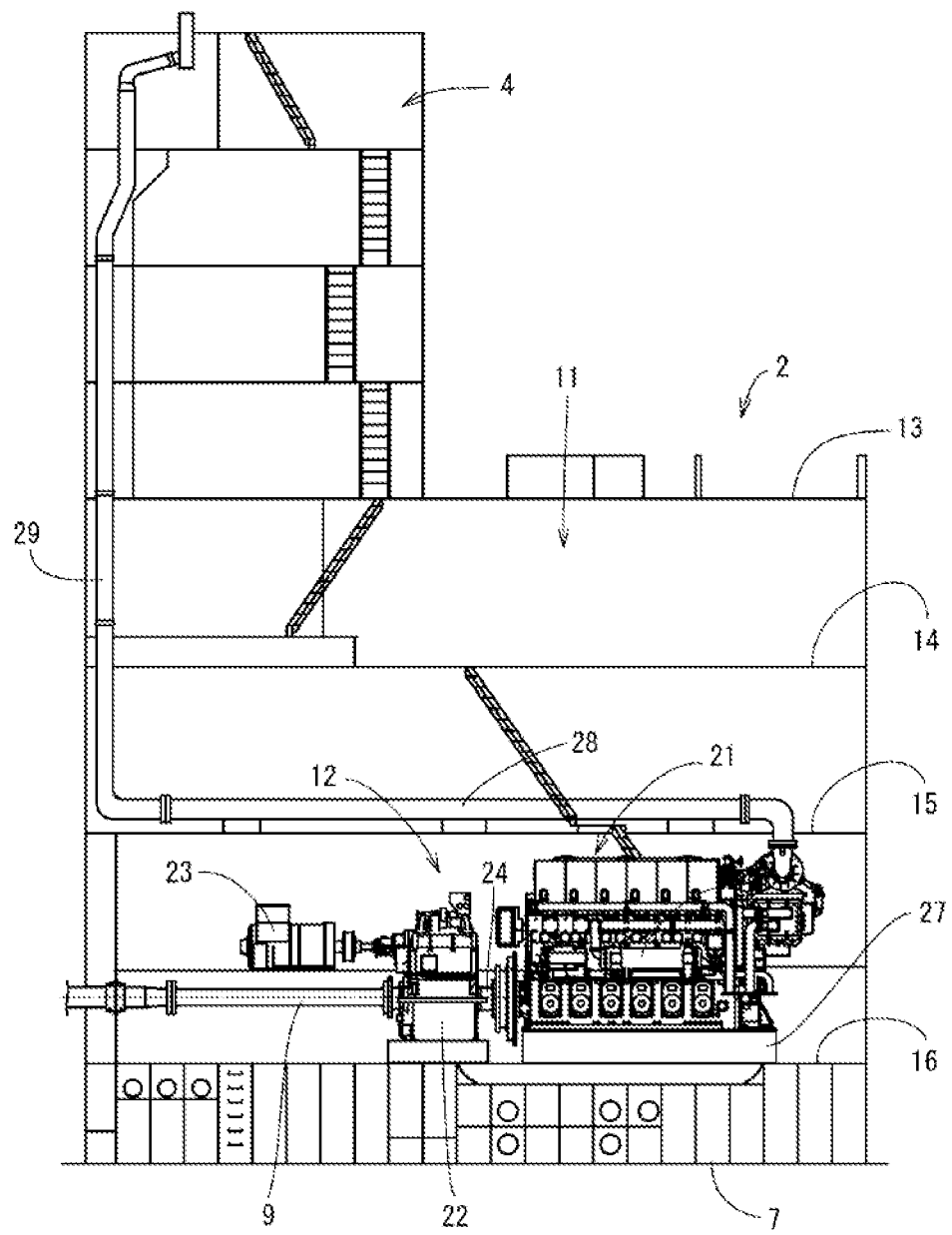
FIG. 2 illustrates a side cross sectional view of an engine room.
Figure 3:
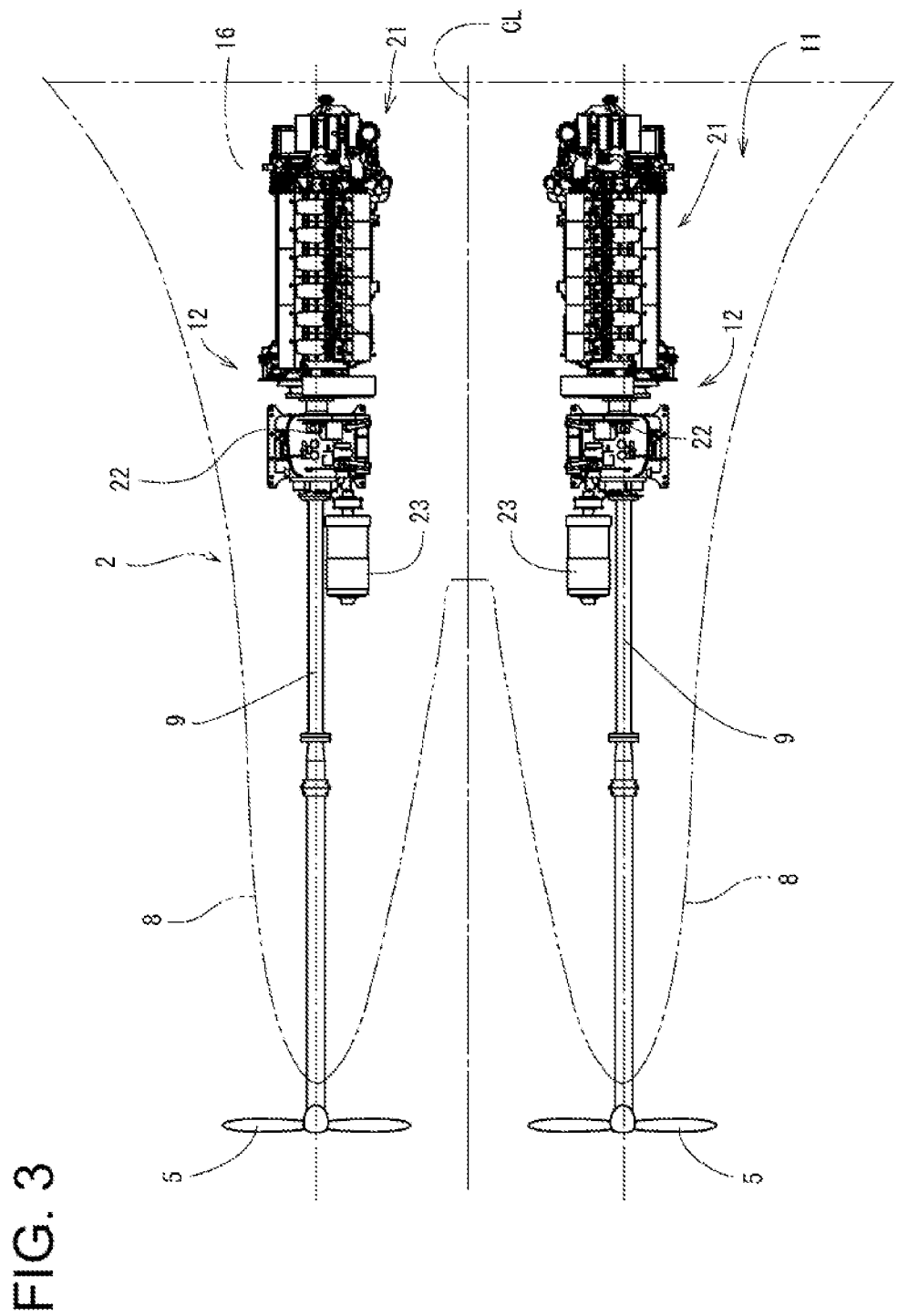
FIG. 3 illustrates an explanatory plan view of the engine room.

First, an overview of the ship is described. As shown in FIG. 1 to FIG. 3, the ship 1 of the present embodiment includes: a ship hull 2, a cabin 3 (bridge) provided on the stern side of the ship hull 2, a funnel 4 (chimney) positioned behind the cabin 3, and a pair of propellers 5 and a rudder 6 provided on a lower back portion of the ship hull 2. In this case, a pair of skegs 8 are integrally formed on the ship bottom 7 on the stern side. On each of the skegs 8, a propeller shaft 9 for driving to rotate the propeller 5 is pivotally supported. The skegs 8 are symmetrically formed on the left and right, with respect to the ship hull center line CL (see FIG. 3) which divides the lateral width direction of the ship hull 2. That is, the first embodiment adopts a twin skeg as the stern shape of the ship hull 2.

On a bow side and a middle part of the ship hull 2, a hold 10 is provided. On the stern side of the ship hull 2, an engine room 11 is provided. In the engine room 11, a pair of propulsion/electric power generating mechanisms 12 each serving as a drive source for propeller 5 and as an electric power supply of the ship 1 is positioned on the left and right across the ship hull center line CL. The rotary power transmitted from each propulsion/electric power generating mechanism 12 to the propeller shaft 9 drives and rotates the propeller 5. The inside of the engine room 11 is parted relative to the up and down directions, by an upper deck 13, a second deck 14, a third deck 15, and an inner bottom plate 16. The propulsion/electric power generating mechanisms 12 of the first embodiment are installed on the inner bottom plate 16 at the lower most stage of the engine room 11. It should be noted that, although details are not illustrated, the hold 10 is divided into a plurality of compartments.

As shown in FIG. 2 and FIG. 3, each propulsion/electric power generating mechanism 12 is a combination of: a medium-speed engine device 21 (dual-fuel engine, in the embodiment) which serves as a drive source of the propeller 5; a speed reducer 22 configured to transmit power of the engine device 21 to the propeller shaft 9; and a shaft-driven generator 23 which generates electric power by the power of the engine device 21. The term "medium-speed" engine herein means one that drives at a rotational speed of approximately 500 to 1000 times per minute. In this connection, a "low-speed" engine drives at a rotational speed of 500 times or less per minute, and a "high-speed" engine drives at a rotational speed of 1000 times or more per minute. The engine device 21 of the embodiment is configured to drive at a constant speed within a range of medium-speed (approximately 700 to 750 times per minute).

The engine device 21 includes: a cylinder block 25 having an engine output shaft (crank shaft) 24, and cylinder heads 26 mounted on the cylinder block 25. On the inner bottom plate 16 at the lower most stage of the engine room 11, a base mount 27 is mounted directly or through a vibration isolator (not shown). On this base mount 27, the cylinder block 25 of the engine device 21 is mounted. The engine output shaft 24 extends in the front/rear length direction of the ship hull 2. That is, the engine device 21 is arranged in the engine room 11 with the direction of the engine output shaft 24 directed in the front/rear length direction of the ship hull 2.

The speed reducer 22 and the shaft-driven generator 23 are disposed on the stern side of the engine device 21. From the rear surface side of the engine device 21, a rear end side of an engine output shaft 24 protrudes. On the rear end side of the engine output shaft, the speed reducer 22 is coupled in such a manner as to be capable of transmitting power. The shaft-driven generator 23 is arranged on the opposite side of the engine device 21 across the speed reducer 22. The engine device 21, the speed reducer 22, and the shaft-driven generator 23 are aligned in this order from the front of the engine room 11. In this case, the speed reducer 22 and the shaft-driven generator 23 are arranged in or nearby the skegs 8 on the stern side. Therefore, regardless of the limitation of the buttock line of the ship 1, it is possible to arrange the engine device 21 as close as possible to the stern side, contributing to the compactification of the engine room 11.

A propeller shaft 9 is provided on the downstream side of the power transmission of the speed reducer 22. The outer shape of the speed reducer 22 protrudes downward than the engine device 21 and the shaft-driven generator 23. To the rear surface side of this protruding portion, the front end side of the propeller shaft 9 is coupled so as to enable power transmission. The engine output shaft 24 (axial center line) and the propeller shaft 9 are coaxially positioned in plan view. The propeller shaft 9 extends in the front/rear length direction of the ship hull 2, while being shifted in the vertical direction from the engine output shaft 24 (axial center line).

In this case, the propeller shaft 9 is located at a position lower than the shaft-driven generator 23 and the engine output shaft 24 (axial center line) in side view, and close to the inner bottom plate 16. In other words, the shaft-driven generator 23 and the propeller shaft 9 are sorted up and down and do not interfere with each other. Therefore, it is possible to make each propulsion/electric power generating mechanism 12 compact.

The constant speed power of the engine device 21 is branched and transmitted from the rear end side of the engine output shaft 24 to the shaft-driven generator 23 and the propeller shaft 9, via the speed reducer 22. Apart of the constant speed power of the engine device 21 is reduced by the speed reducer 22 to, for example, a rotational speed of approximately 100 to 120 rotations per minute and is transmitted to the propeller shaft 9. The propeller 5 is driven and rotated by the speed-reduced power from the speed reducer 22. It should be noted that, as the propeller 5, a variable-pitch propeller capable of adjusting the ship speed through changing the blade angles of the propeller blades. A part of the constant speed power of the engine device 21 is reduced by the speed reducer 22 to, for example, a rotational speed of approximately 1200 to 1800 rotations per minute and is transmitted to the PTO shaft pivotally supported by the speed reducer 22. The rear end side of the PTO shaft of the speed reducer 22 is connected to the shaft-driven generator 23 in such manner as to be capable of transmitting the power, and the shaft-driven generator 23 is driven to generate electric power based on the rotary power from the speed reducer 22. Generated electric power by the shaft-driven generator 23 is supplied to electric system in the ship hull 2.

To the engine device 21, an intake path (not shown) for taking in the air and an exhaust path 28 for outputting exhaust gas are connected. The air takin in through the intake path is fed into cylinders 36 (into cylinders of air intake stroke) of the engine device 21. Further, since there are two engine devices 21, there are two exhaust paths 28. Each exhaust path 28 is connected to an extension path 29. The extension path 29 extends to the funnel 4, and is structured to be directly in communication with the outside. The exhaust gas from the engine device 21 is emitted outside the ship 1 through the exhaust path 28 and the extension path 29.

As is apparent from the above description, there is a pair of propulsion/electric power generating mechanisms 12 each of which is a combination of the engine device 21, the speed reducer 22 configured to transmit power from the engine device 21 to the propeller shaft 9 which drives and rotate propeller 5 for propelling the ship, and the shaft-driven generator 23 configured to generate electric power with the power from the engine device 21. The pair of propulsion/electric power generating mechanisms 12 are arranged and sorted on the left side of the ship hull center line CL, in the engine room 11 of the ship hull 2. Therefore, the space for setting up in the engine room 11 is downsized as compared with a traditional structure in which a plurality of engines (main engine and auxiliary engine) in an engine room. Therefore, the engine room 11 can be structured compact by shortening the front/rear length of the engine room 11, which in turn facilitates ensuring a hold space (space other than the engine room 11) in the ship hull 2. Two propellers 5 for driving can improve the propulsion efficiency of the ship 1.

Since there are two engine devices 21 which are each a main engine, for example, even when one of the engine devices 21 brakes down and cannot be driven, the other one of the engine devices 21 enables the navigation, and it is possible to ensure redundancy in the motor device of the ship and in turn the ship 1. Further, as is hereinabove mentioned, rotation drive of the propellers 5 and the drive of the shaft-driven generator 23 are possible with the engine devices 21, one of the shaft-driven generators 23 can be reserved as a spare during an ordinary cruise. Therefore, for example, if one engine device 21 or the shaft-driven generator 23 breaks down thus shutting down electric power supply, the power supply can be recovered by activating the other shaft-driven generator 23 and establishing the frequency and the voltage. Further, if the engine device 21 stops during the cruise with only that one engine device 21, the power supply can be recovered by activating the other engine device 21 having been stopped and in turn, the shaft-driven generator 23 corresponding to the other engine device 21 and establishing the frequency and the voltage.

Figure 4:
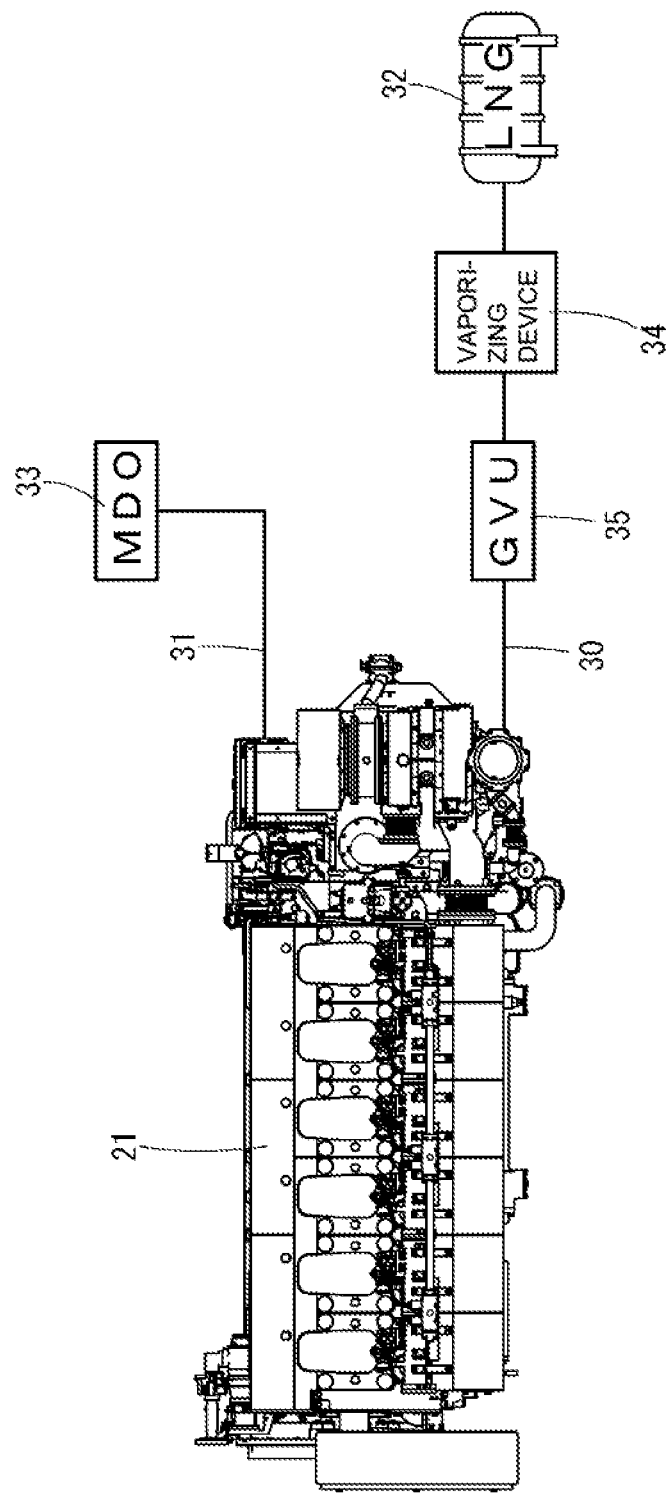
FIG. 4 illustrates a schematic view showing a structure of a fuel supply path of an engine device in the embodiment of the present invention.
Figure 5:
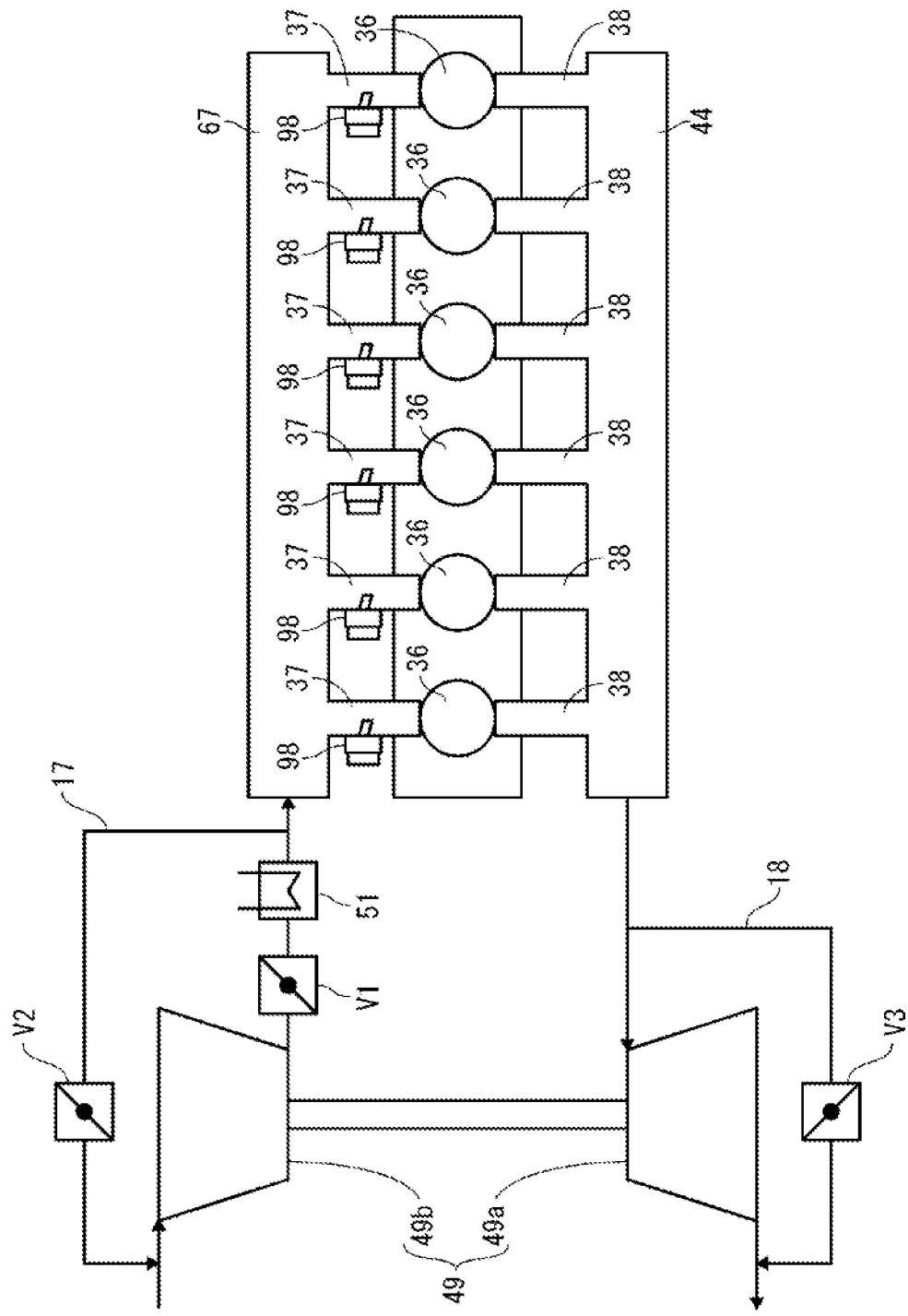
FIG. 5 illustrates a schematic view schematically illustrating the structure of an intake/exhaust passage in the engine device.
Figure 6:
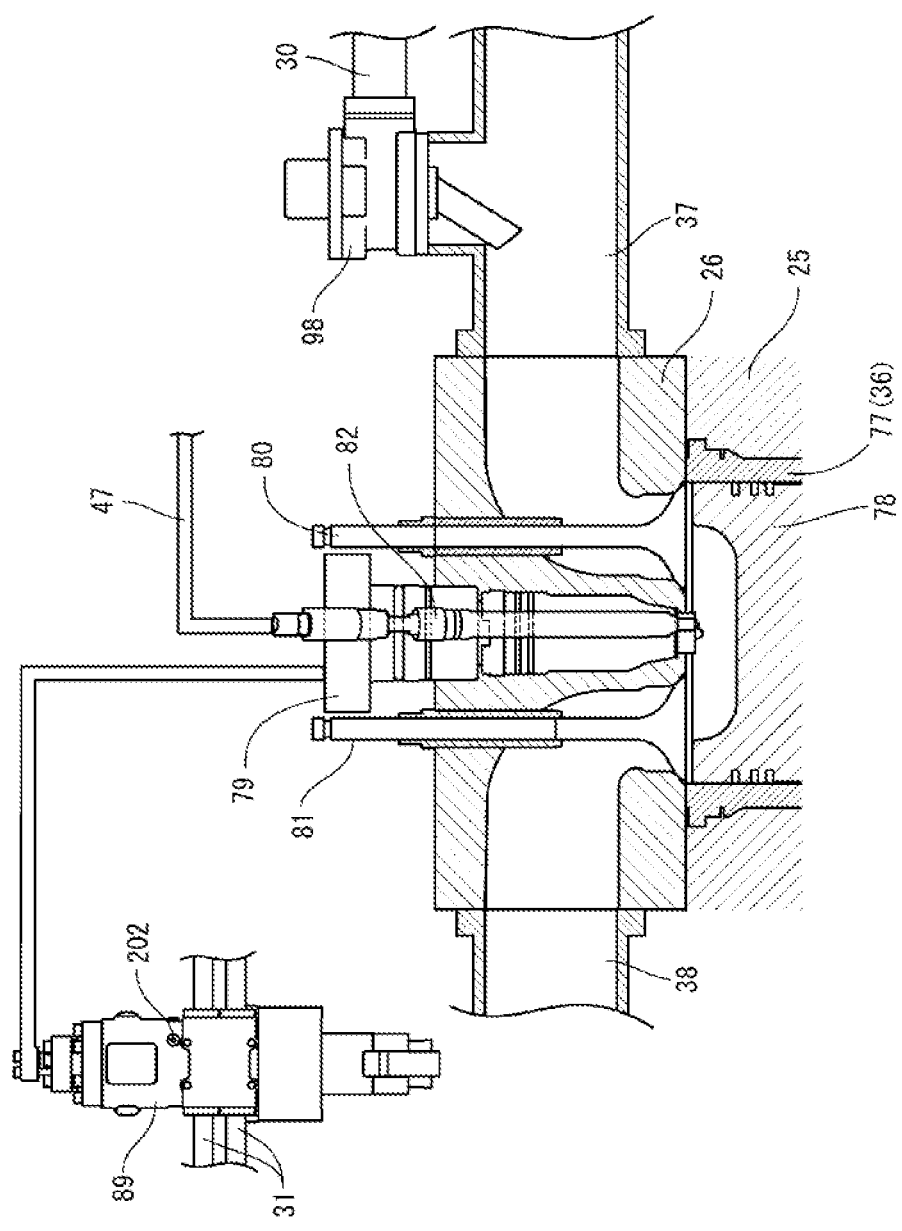
FIG. 6 illustrates a schematic view schematically illustrating the structure of the inside of a cylinder head in the engine device.
Figure 7:
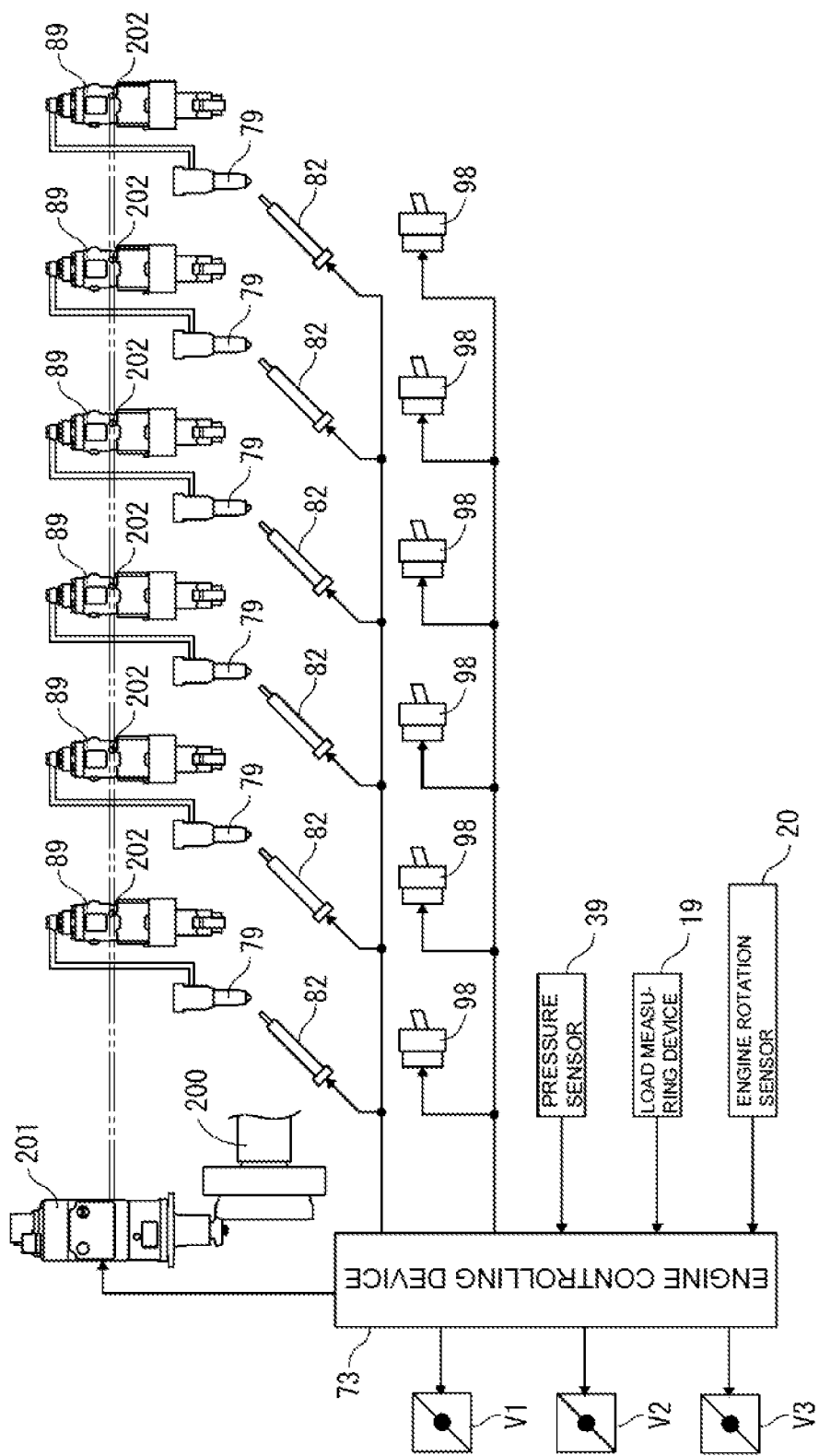
FIG. 7 illustrates a control block diagram of the engine device.

Next, the following describes, with reference to FIG. 4 to FIG. 7, a schematic structure of the dual-fuel engine 21 used as the main engine in the above-described ship 1. The dual-fuel engine 21 (hereinafter, simply referred to as "engine device 21") is selectively driven in one of: a premixed combustion mode in which fuel gas such as natural gas is mixed and combusted with the air; and a diffusion combustion mode in which a liquid fuel (fuel oil) such as crude oil is diffused and combusted. FIG. 4 is a diagram showing a fuel system of the engine device 21. FIG. 5 is a diagram showing an intake/exhaust system of the engine device 21. FIG. 7 is a control block diagram of the engine device 21.

As shown in FIG. 4, the engine device 21 is such that fuel is supplied from two systems of fuel supply paths 30, 31, and one of the fuel supply paths 30 is connected to a gas fuel tank 32, while the other one of the fuel supply paths 31 is connected to a liquid fuel tank 33. That is, the engine device 21 is structured so that the fuel gas is supplied from the fuel supply path 30 to the engine device 21, and that fuel oil is supplied to the engine device 21 from the fuel supply path 31. The fuel supply path 30 includes: a gas fuel tank 32 configured to store liquefied gaseous fuel; a vaporizing device 34 configured to vaporize the liquefied fuel (fuel gas) in the gas fuel tank 32; and a gas valve unit 35 configured to adjust a fuel gas supply amount from the vaporizing device 34 to the engine device 21. That is, in the structure of the fuel supply path 30, the vaporizing device 34 and the gas valve unit 35 are arranged in this order from the gas fuel tank 32 towards the engine device 21.

As shown in FIG. 5, the engine device 21 has a structure in which a plurality of cylinders 36 (six cylinders in the present embodiment) are serially aligned in a later-described cylinder block 25. Each cylinder 36 is in communication with an intake manifold (intake passage) 67 structured in the cylinder block 25, through an intake port 37. Each cylinder 36 is in communication with an exhaust manifold (exhaust gas passage) 44 arranged above the cylinder heads 26, through an exhaust port 38. To the intake port 37 of each cylinder 36, a gas injector 98 is arranged. Therefore, while the air from the intake manifold 67 is supplied to each cylinder 36 through the intake port 37, the exhaust gas from each cylinder 36 is ejected to the exhaust manifold 44 through the exhaust port 38. Further, while the engine device 21 is operated in the gas mode, the fuel gas is supplied from the gas injector 98 to the intake port 37. The fuel gas is then mixed with the air from the intake manifold 67, and a premixed gas is supplied to each cylinder 36.

An exhaust gas outlet side of the exhaust manifold 44 is connected to an exhaust gas inlet of a turbine 49a of a turbocharger 49 is connected. An air inlet side (fresh air inlet side) of the intake manifold 67 is connected to an air ejection port (fresh air outlet) of an intercooler 51. An air inlet port (fresh air inlet) of the intercooler 51 is connected to the air ejection port (fresh air outlet) of a compressor 49b of the turbocharger 49. Between the compressor 49b and the intercooler 51, a main throttle valve V1 is arranged. By adjusting the valve opening degree of the main throttle valve V1, the flow rate of air to be supplied to the intake manifold 67 is adjusted.

A supplied-air bypass passage 17 configured to circulate a part of the air exhausted from the outlet of the compressor 49b to the inlet of the compressor 49b connects the air inlet port (fresh air inlet) side of the compressor 49b with the air outlet side of the intercooler 51. That is, the supplied-air bypass passage 17 is opened to the outside air on the upstream side of the air inlet port of the compressor 49b, while being connected to a connection part of the intercooler 51 and the intake manifold 67. On this supplied-air bypass passage 17, a supplied-air bypass valve V2 is arranged. By adjusting the valve opening degree of the supplied-air bypass valve V2, the flow rate of air from the downstream side of the intercooler 51 to the intake manifold 67 is adjusted.

The exhaust bypass passage 18 which bypasses the turbine 49a connects the exhaust gas outlet side of the turbine 49a and the exhaust gas outlet side of the exhaust manifold 44. That is, the exhaust bypass passage 18 is opened to the outside air on the downstream side of the exhaust gas outlet of the turbine 49a, while being connected to a connection part of the exhaust gas outlet of the turbine 49a and the exhaust gas inlet of the turbine 49a. On this exhaust bypass passage 18, an exhaust bypass valve V3 is arranged. By adjusting the valve opening degree of the exhaust bypass valve V3, the exhaust gas flow rate flowing in the turbine 49a, and adjust the air compression amount in the compressor 49b.

The engine device 21 includes: a turbocharger 49 configured to compress the air by the exhaust gas from the exhaust manifold 44; and an intercooler 51 configured to cool compressed air compressed by the turbocharger 49 and supply the compressed air to the intake manifold 67. In the engine device 21, the main throttle valve V1 is provided at the connecting portion between the outlet of the turbocharger 49 and the inlet of the intercooler 51. The engine device 21 includes an exhaust bypass passage 18 connecting an outlet of the exhaust manifold 44 and an exhaust gas outlet of the turbocharger 49, and an exhaust bypass valve V3 is arranged in the exhaust bypass passage 18. In cases of optimizing the turbocharger 49 for a diesel mode specification, an air-fuel ratio suitable for an engine load is achieved even in the gas mode, by controlling the opening degree of the exhaust bypass valve V3 according to fluctuation in the engine load. Therefore, shortage and surplus in the air amount necessary for combustion can be prevented at a time of load fluctuation, and the engine device 21 is suitably operated in the gas mode, even if the turbocharger optimized for the diesel mode is used.

The engine device 21 includes the supplied-air bypass passage 17 configured to bypass the turbocharger 49, and the supplied-air bypass valve V2 is arranged in the supplied-air bypass passage 17. By controlling the opening degree of the supplied-air bypass valve V2 according to fluctuation in the engine load, air that matches with the air-fuel ratio required for combustion of the fuel gas is supplied to the engine. Further, by performing in combination a control operation by the supplied-air bypass valve V2 with a good responsiveness, the response speed to the load fluctuation during the gas mode can be accelerated.

In the engine device 21, the supplied-air bypass passage 17 is connected in a position between the inlet of the intercooler 51 and the main throttle valve V1, the compressed air ejected from the compressor 49b is circulated to the inlet of the compressor 49b. This way, the responsiveness of the flow rate control by the exhaust bypass valve V3 is compensated by the supplied-air bypass valve V2, and the control band of the supplied-air bypass valve V2 is compensated by the exhaust bypass valve V3. Therefore, the followability of the air-fuel ratio control during the gas mode can be made favorable, when the load fluctuation takes place or at a time of switching the operation mode in a shipboard application.

As shown in FIG. 6, in the engine device 21, a cylinder 77 (cylinder 36) having a cylindrical shape is inserted in the cylinder block 25. By having the piston 78 reciprocating in the up-down directions in the cylinder 77, the engine output shaft 24 on the lower side of the cylinder 77 is rotated. On each of the cylinder heads 26 on the cylinder block 25, a main fuel injection valve 79 which receives fuel oil (liquid fuel) from fuel oil pipes 42 has its leading end inserted into the cylinder 77. This fuel injection valve 79 has its leading end arranged in a center position on the upper end surface of the cylinder 77, and injects the fuel oil into the main combustion chamber structured by the upper surface of the piston 78 and the inner wall surface of the cylinder 77. Therefore, while the engine device 21 is driven in the diffusion combustion mode, the fuel oil is injected from the fuel injection valve 79 into the main combustion chamber in the cylinder 77, and reacts with the compressed air to cause diffusion combustion.

In each cylinder head 26, an intake valve 80 and an exhaust valve 81 are installed on the outer circumference side of the main fuel injection valve 79. When the intake valve 80 opens, the air from the intake manifold 67 is taken into the main chamber in the cylinder 77. On the other hand, when the exhaust valve 81 opens, the combustion gas (exhaust gas) in the main combustion chamber in the cylinder 77 is exhausted to the exhaust manifold 44. By having a push rod (not shown) reciprocating up and down according to the rotation of the cam shaft (not shown), the locker arm (not shown) swings to reciprocate the intake valve 80 and the exhaust valve 81 in the up and down.

A pilot fuel injection valve 82 that generates ignition flames in the main combustion chamber is obliquely inserted with respect to the cylinder head 26 so its leading end is arranged nearby the leading end of the main fuel injection valve 79. The pilot fuel injection valve 82 adopts a micro pilot injection method and has, on its leading end, a sub chamber from which pilot fuel is injected. That is, in the pilot fuel injection valve 82, the pilot fuel supplied from the common-rail 47 is injected into the sub chamber and combusted, to generate ignition flame in the center position of the main combustion chamber in the cylinder 77. Therefore, while the engine device 21 is driven in the premixed combustion mode, the ignition flame generated by the pilot fuel injection valve 82 causes reaction of a premixed gas which is supplied in the main combustion chamber of the cylinder 77 through the intake valve 80, thus leading to premixed combustion.

As shown in FIG. 7, the engine device 21 has an engine controlling device 73 configured to control each part of the engine device 21. In the engine device 21, the pilot fuel injection valve 82, a combustion injection pump 89, and a gas injector 98 are provided for each cylinder 36. The engine controlling device 73 provides control signals to the pilot fuel injection valve 82, the combustion injection pump 89, and the gas injector 98 to control injection of pilot fuel by the pilot fuel injection valve 82, fuel oil supply by the fuel injection valve 89, and gas fuel supply by the gas injector 98.

As shown in FIG. 7, the engine device 21 includes a cam shaft 200 having, for each cylinder 36, an exhaust cam, an intake cam, and a fuel cam not shown). The cam shaft 200 rotates the exhaust cam, the intake cam, and the fuel cam with rotary power transmitted from the crank shaft 24 through a gear mechanism (not shown) to open and close the intake valve 80 and the exhaust valve 81 of each cylinder 36 and to drive the fuel injection pump 89. The engine device 21 includes a speed adjuster 201 configured to adjust a rack position of a control rack 202 in the fuel injection pump 89. The speed adjuster 201 measures the engine rotation number of the engine device 21 based on the rotation number of the leading end of the cam shaft 200, to set the rack position of the control rack 202 in the fuel injection pump 89, thereby adjusting the fuel injection amount.

The engine controlling device 73 provides control signals to the main throttle valve V1 and the supplied-air bypass valve V2, and the exhaust bypass valve V3 to adjust their valve opening degrees, thereby adjusting the air pressure (intake manifold pressure) in the intake manifold 67. The engine controlling device 73 detects the intake manifold pressure based on a measurement signal from the pressure sensor 39 configured to measure the air pressure in the intake manifold 67. The engine controlling device 73 calculates the load imposed to the engine device 21, based on a measurement signal from a load measuring device 19 such as a watt transducer and a torque sensor. The engine controlling device 73 detects the engine rotation number of the engine device 21, based on a measurement signal from an engine rotation sensor 20 such as a pulse sensor configured to measure the rotation number of the crank shaft 24.

When the engine device 21 is operated in the diesel mode, the engine controlling device 73 controls opening and closing of the control valve in the fuel injection pump 89, and causes combustion in each cylinder 36 at a predetermined timing. That is, by opening the control valve of the fuel injection pump 89 according to an injection timing of each cylinder 36, the fuel oil is injected into the cylinder 36 through the main fuel injection valve 79, and ignited in the cylinder 36. Further, in the diesel mode, the engine controlling device 73 stops supply of the pilot fuel and the fuel gas.

In the diesel mode, the engine controlling device 73 performs feedback control for an injection timing of the main fuel injection valve 79 in the cylinder 36, based on the engine load (engine output) measured by the load measuring device 19 and the engine rotation number measured by the engine rotation sensor 20. This way, the engine 21 outputs an engine load needed by propulsion/electric power generating mechanism 12 and rotates at an engine rotation number according to the propulsion speed of the ship. Further, the engine controlling device 73 controls the opening degree of the main throttle valve V1 based on the intake manifold pressure measured by the pressure sensor 39, so as to supply compressed air from the turbocharger 49 to the intake manifold 67, at an air flow rate according to the required engine output.

While the engine device 21 is operated in the gas mode, the engine controlling device 73 adjusts the valve opening degree in the gas injector 98 to set the flow rate of fuel gas supplied to each cylinder 36. Then, the engine controlling device 73 controls opening and closing of the pilot fuel injection valve 82 to cause combustion in each cylinder 36 at a predetermined timing. That is, the gas injector 98 supplies the fuel gas to the intake port 37, at a flow rate based on the valve opening degree, mix the fuel gas with the air from the intake manifold 67, and supplies the premixed fuel to the cylinder 36. Then, the control valve of the pilot fuel injection valve 82 is opened according to the injection timing of each cylinder 36, thereby generating an ignition source by the pilot fuel and ignite in the cylinder 36 to which the premixed gas is supplied. Further, in the gas mode, the engine controlling device 73 stops supply of the fuel oil.

In the gas mode, the engine controlling device 73 performs feedback control for the fuel gas flow rate by the gas injector 98 and for an injection timing of the pilot fuel injection valve 82 in the cylinder 36, based on the engine load measured by the load measuring device 19 and the engine rotation number measured by the engine rotation sensor 20. Further, the engine controlling device 73 adjusts the opening degrees of the main throttle valve V1, the supplied-air bypass valve V2, and the exhaust bypass valve V3, based on the intake manifold pressure measured by the pressure sensor 39. This way, the intake manifold pressure is adjusted to a pressure according to the required engine output, and the air-fuel ratio of the fuel gas supplied from the gas injector 98 can be adjusted to a value according to the engine output.

Figure 8:
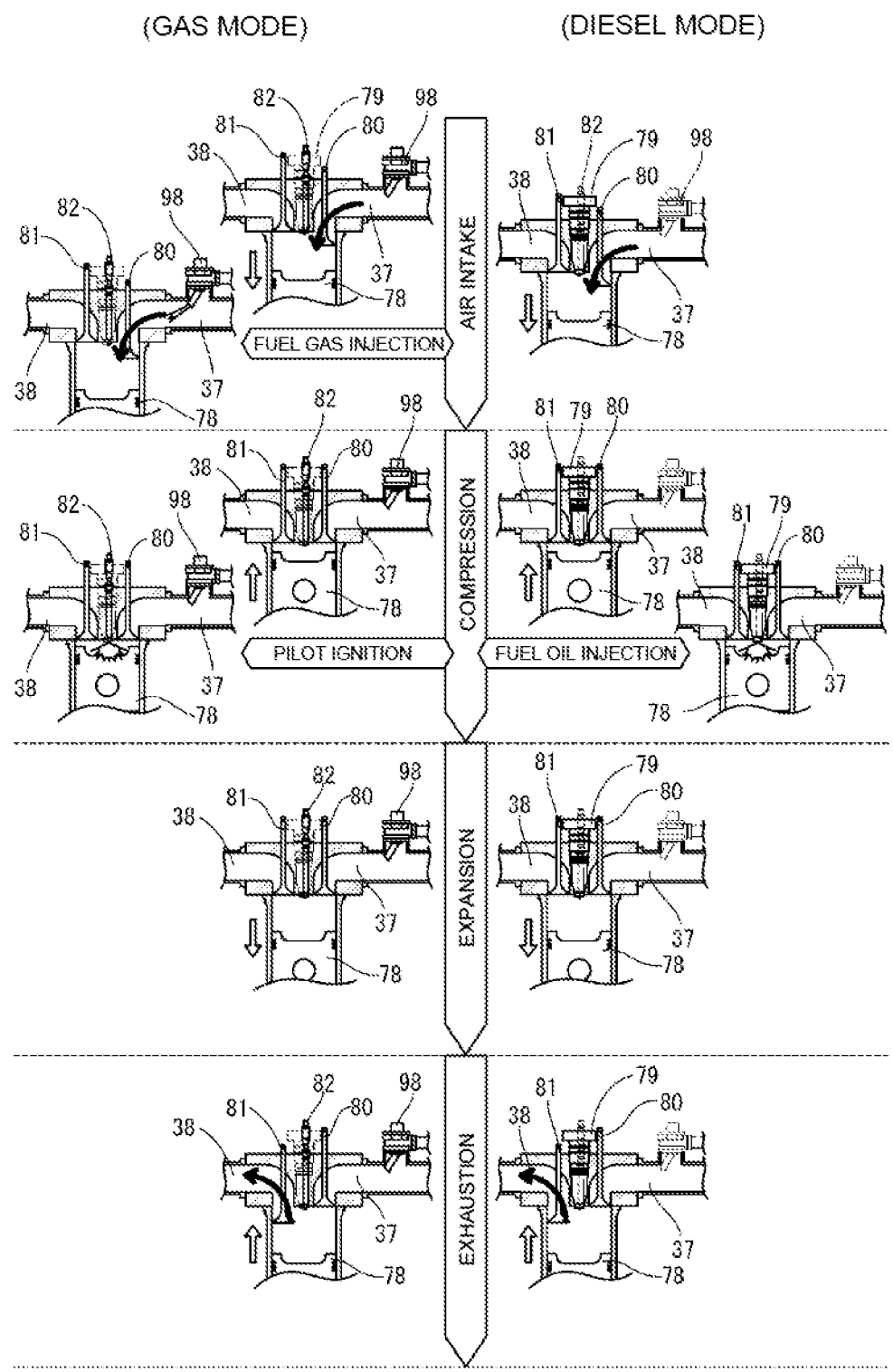
FIG. 8 illustrates an explanatory diagram showing an operation in the cylinder, in each of a gas mode and a diesel mode.
Figure 9:
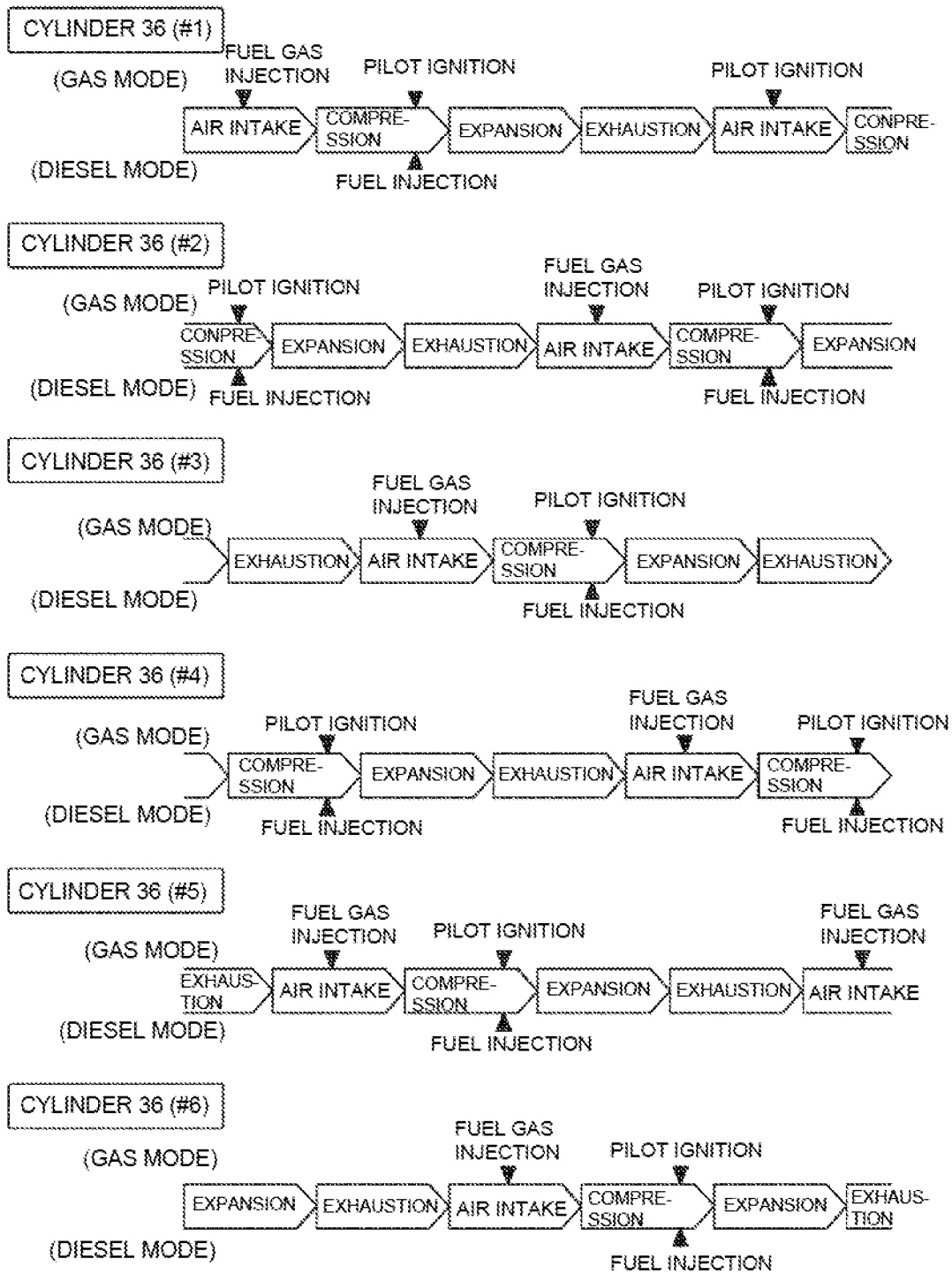
FIG. 9 illustrates a state transition diagram showing operation states of each cylinder in the engine device structured by six gas columns.

As shown in FIG. 8 and FIG. 9, in the engine device 21, the air intake valve 80 opens as the piston 78 drop in the cylinder 77, and the air from the intake manifold 67 flows into the cylinder 77 through the intake port 37 (air intake stroke). At this time, in the gas mode, the fuel gas is supplied from the gas injector 98 to the intake port 37. The fuel gas is then mixed with the air from the intake manifold 67, and a premixed gas is supplied to each cylinder 77.

Next, as shown in FIG. 8 and FIG. 9, in the engine device 21, the intake valve 80 closes as the piston 78 rises, thereby compressing the air in the cylinder 77 (compressing stroke). At this time, in the gas mode, when the piston 78 rises to the vicinity of the top dead point, an ignition flame is generated by the pilot fuel injection valve 82, to combust the premixed gas in the cylinder 77. In the diesel mode on the other hand, by opening the control valve of the fuel injection pump 89, the fuel oil is injected into the cylinder 77 through the main fuel injection valve 79, and ignited in the cylinder 77.

Next, as shown in FIG. 8 and FIG. 9, in the engine device 21, the combustion gas (exhaust gas produced by combusting reaction) in the cylinder 77 expands due to the combustion, thus causing the piston 78 to drop (expansion stroke). After that, the piston 78 rises and the exhaust valve 81 opens at the same time. Then, the combustion gas (exhaust gas) in the cylinder 77 is exhausted to the exhaust manifold 44 through the exhaust port 38 (exhaust stroke).

As shown in FIG. 5, the engine device 21 of the present embodiment includes six cylinders 36 (cylinders 77). The state of each cylinder 36 transits in an order of the air intake stroke, the compressing stroke, the expansion stroke, and the exhaust stroke shown in FIG. 8, at timings determined for each cylinder 36. That is, state transitions to each of the air intake stroke, the compressing stroke, the expansion stroke, and the exhaust stroke sequentially take place in the six cylinders 36 (#1 to #6), in an order of #1→#5→#3→#6→#2→#4, as shown in FIG. 9. Thus, while the engine device 21 operates in the gas mode, fuel gas injection from the gas injector 98 in the air intake stroke and ignition by the pilot fuel injection valve 82 in the compressing stroke are performed in an order of #1→#5→#3→#6→#2→#4. Similarly, while the engine device 21 operates in the diesel mode, fuel oil injection from the main fuel injection valve 79 in the compressing stroke are performed in an order of #1→#5→#3→#6→#2→#4.

Figure 10:
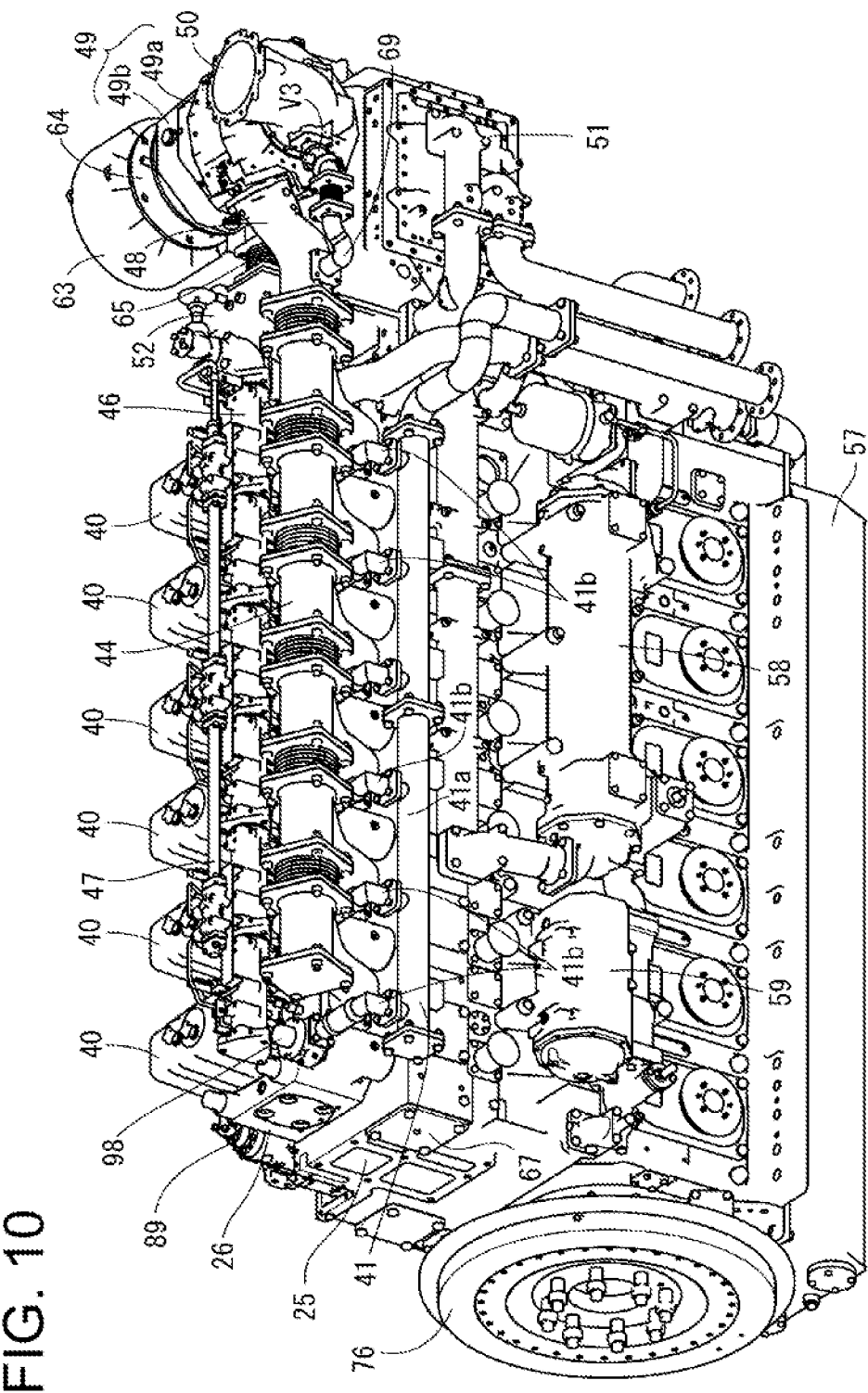
FIG. 10 illustrates a perspective view showing a side (right side face) of the engine device of the embodiment of the present invention, on which side an exhaust manifold is installed.
Figure 11:
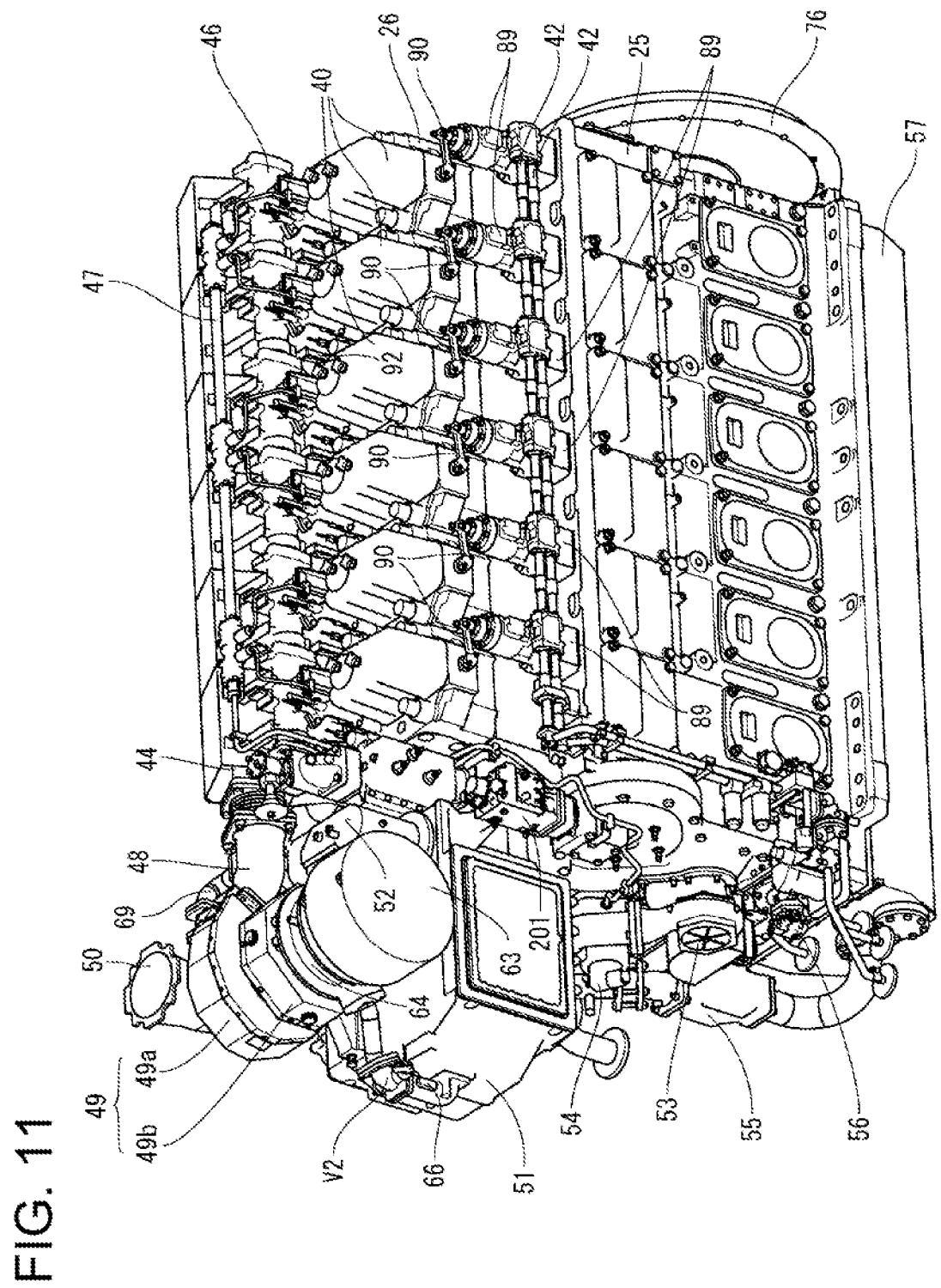
FIG. 11 illustrates a perspective view showing a side (right side face) of the engine device, on which side a fuel injection pump is installed.
Figure 12:
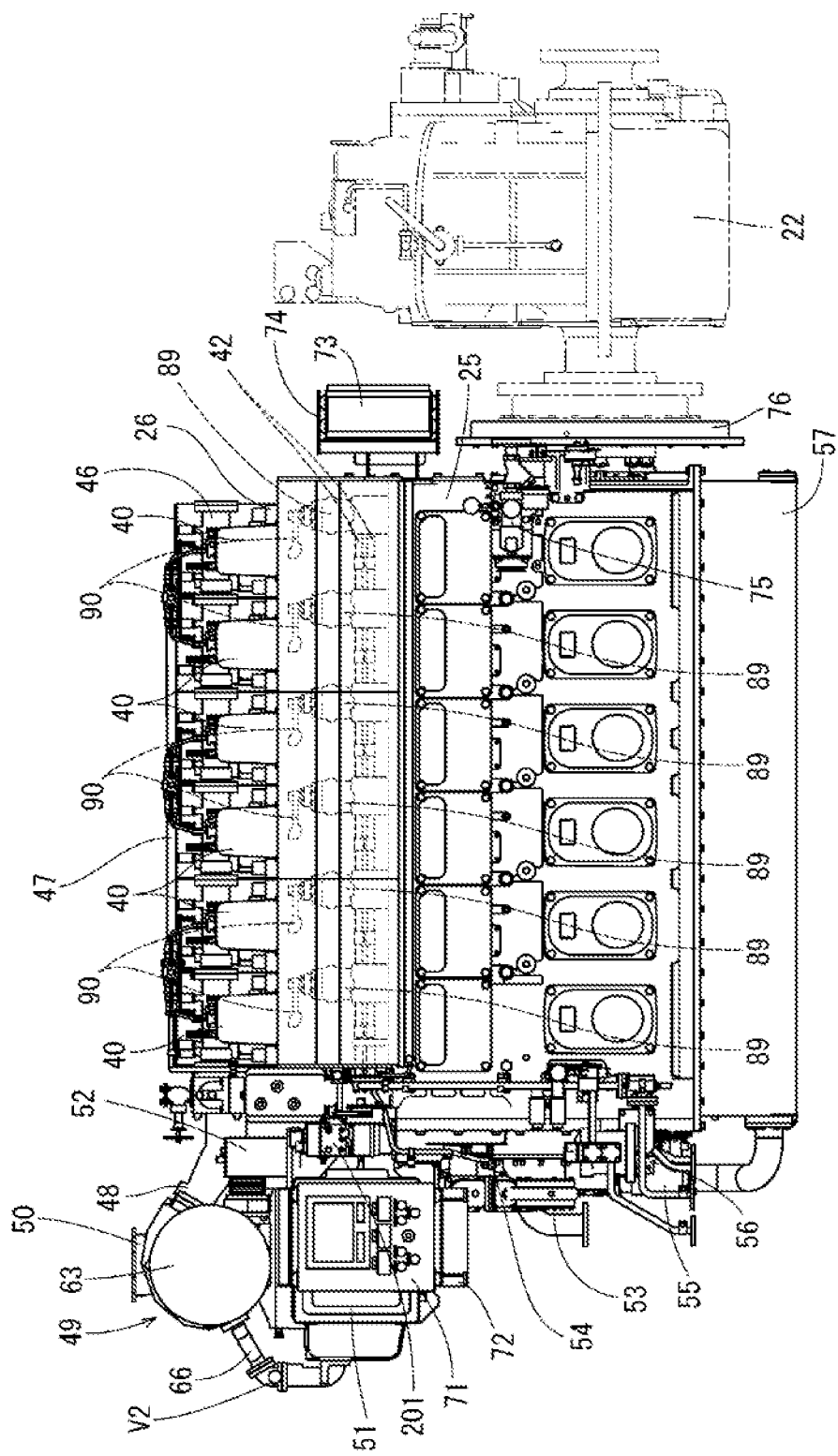
FIG. 12 illustrates a left side view of the engine device.

Next, the following details the structure of the dual-fuel engine 21 (engine device 21) having the above schematic structure, with reference to FIG. 10 to FIG. 12. In the following description, the positional relationship of the front, rear, left, and right in the structure of the engine device 21 are designated with the side connecting to the speed reducer 22 as the rear side.

As shown in FIG. 10 to FIG. 12, the engine device 21 has the cylinder heads 26 having a plurality of head covers 40 aligned in a single array in the front-rear direction, on the cylinder block 25 arranged on the base mount 27 (see FIG. 2). The engine device 21 has a gas manifold (gaseous fuel pipe) 41 extended in parallel to the array of the head covers 40, on the right side faces of the cylinder heads 26, and fuel oil pipes (liquid fuel pipes) 42 extended in parallel to the array of the head covers 40, on the left side face of the cylinder block 25. Further, on the upper side of the gas manifold 41, the later-described exhaust manifold (exhaust gas passage) 44 extends parallel to the array of the head covers 40.

Between the array of the head covers 40 and the exhaust manifold 44, an on-cylinder head cooling water pipe 46 connecting to a cooling water passage in the cylinder heads 26 is extended in parallel to the array of the head covers 40. On the upper side of the cooling water pipe 46, a common-rail (pilot fuel pipe) 47 configured to supply a pilot fuel such as light oil is extended in parallel to the array of the head covers 40, similarly to the cooling water pipe 46. At this time, the cooling water pipe 46 is connected to and supported by the cylinder heads 26, and the common-rail 47 is connected to and supported by the cooling water pipe 46.

The front end of the exhaust manifold 44 (exhaust gas outlet side) is connected to the turbocharger 49 through the exhaust gas relay pipe 48. Therefore, exhaust gas exhausted through the exhaust manifold 44 flows into the turbine 49a of the turbocharger 49 through the exhaust gas relay pipe 48, thus rotating the turbine 49a and rotating the compressor 49b on the same shaft as the turbine 49a. The turbocharger 49 is arranged on the upper side of the front end of the engine device 21, and has the turbine 49a on its right side, and the compressor 49b on the left side. An exhaust gas outlet pipe 50 is arranged on the right side of the turbocharger 49, and is connected to the exhaust gas outlet of the turbine 49a, to output exhaust gas from the turbine 49a to the exhaust path 28 (see FIG. 2).

On the lower side of the turbocharger 49, an intercooler 51 that cools down a compressed air from the compressor 49b of the turbocharger 49 is arranged. That is, on the front end side of the cylinder block 25, the intercooler 51 is installed, and the turbocharger 49 is placed in the upper part of the intercooler 51. In the laterally middle layer position of the turbocharger 49, the air ejection port of the compressor 49b is provided so as to be open rearwards (towards the cylinder block 25). On the other hand, on the top surface of the intercooler 51, an air inlet port is provided which opens upward, and through this air inlet port, compressed air ejected from the compressor 49b flows into the intercooler 51. The air ejection port of the compressor 49b and the air inlet port of the intercooler 51 are in communication with each other through an intake relay pipe 52 two which one ends of the ports are connected. The intake relay pipe 52 has the above-described main throttle valve V1 (see FIG. 5).

On the front end surface (front surface) of the engine device 21, a cooling water pump 53, a pilot fuel pump 54, a lubricating oil pump (priming pump) 55, and a fuel oil pump 56 are installed on the outer circumference side of the engine output shaft 24. The cooling water pump 53 and the fuel oil pump 56 are arranged up and down close to the left side face, respectively, and the pilot fuel pump 54 and the lubricating oil pump 55 are arranged up and down close to the right side face, respectively. Further, in the front end portion of the engine device 21, a rotation transmitting mechanism (not shown) configured to transmit rotary power of the engine output shaft 24. This way, the rotary power from the engine output shaft 24 is transmitted through the rotation transmitting mechanism to rotate the cooling water pump 53, the pilot fuel pump 54, the lubricating oil pump 55, and the fuel oil pump 56 provided on the outer circumference of the engine output shaft 24. Further, in the cylinder block 25, a cam shaft (not shown) whose axial direction is in the front-rear direction is pivotally supported on the upper side of the cooling water pump 53, and the cam shaft also rotated by the rotary power of the engine output shaft 24 transmitted through the rotation transmitting mechanism.

On the lower side of the cylinder block 25, an oil pan 57 is provided, and the lubricating oil that flows in the cylinder block 25 is accumulated in this oil pan 57. The lubricating oil pump 55 is connected to a suction port at the lower side of the oil pan 57 via the lubricating oil pipe, and sucks the lubricating oil accumulated in the oil pan 57. Further, the lubricating oil pump 55 has its ejection port on the upper side connected to the lubricating oil inlet of a lubricating oil cooler 58 through the lubricating oil pipe so as to supply the lubricating oil sucked from the oil pan 57 to the lubricating oil cooler 58. The front and the rear of the lubricating oil cooler 58 serve as the lubricating oil inlet and the lubricating oil outlet, respectively, and the lubricating oil outlet is connected to a lubricating oil strainer 59 through a lubricating oil pipe. The front and the rear of the lubricating oil strainer 59 serve as the lubricating oil inlet and the lubricating oil outlet, respectively, and the lubricating oil outlet is connected to the cylinder block 25. Thus, the lubricating oil fed from the lubricating oil pump 55 is cooled in the lubricating oil cooler 58, and then purified by the lubricating oil strainer 59.

The turbocharger 49 pivotally supports, on the same shaft, the compressor 49b and the turbine 49a arranged on the left and right. Based on rotation of the turbine 49a introduced from the exhaust manifold 44 through the exhaust gas relay pipe 48, the compressor 49b is rotated. Further, the turbocharger 49 has, on the left side of the compressor 49b serving as fresh air intake side, an intake filter 63 which removes dust from outside air introduced and a fresh air passage pipe 64 connecting the intake filter 63 and the compressor 49b. By having the compressor 49b rotate in sync with the turbine 49a, the outside air (air) taken in to the intake filter 63 is introduced into the compressor 49b through the turbocharger 49. The compressor 49b then compresses the air taken in from the left side and ejects the compressed air to the intake relay pipe 52 installed on the rear side.

The intake relay pipe 52 has its upper front portion opened and connected to the ejection port on the rear of the compressor 49b, and has its lower side opened and connected to the inlet port on the top surface of the intercooler 51. Further, at a branching port provided on an air passage on the front surface of the intercooler 51, one end of a supplied-air bypass pipe 66 (supplied-air bypass passage 17) is connected, and a part of compressed air cooled by the intercooler 51 is ejected to the supplied-air bypass pipe 66. Further, the other end of the supplied-air bypass pipe 66 is connected to a branching port provided on the front surface of the fresh air passage pipe 64, and a part of the compressed air cooled by the intercooler 51 is circulated to the fresh air passage pipe 64 through the supplied-air bypass pipe 66, and merges with the outside air from the intake filter 63. Further, the supplied-air bypass pipe 66 has the supplied-air bypass valve V2 arranged in its midway portion.

In the intercooler 51, compressed air from the compressor 49b flows in from the left rear side through the intake relay pipe 52, and the compressed air is cooled through a heat exchanging action with cooling water supplied from water-supply pipe. The compressed air cooled on a left chamber inside the intercooler 51 flows in the air passage on the front and is introduced into a right chamber, and then ejected to the intake manifold 67 through an ejection port provided on the rear of the right chamber. The intake manifold 67 is provided on the right side face of the cylinder block 25, and is extended in parallel to the head cover 40, on the lower side of the gas manifold 41. It should be noted that, the flow rate of the compressed air supplied to the intake manifold 67 is set by determining the flow rate of the compressed air circulated from the intercooler 51 to the compressor 49b according to the opening degree of the supplied-air bypass valve V2.

Further, the turbine 49a of the turbocharger 49 connects the inlet port at the rear with the exhaust gas relay pipe 48, and connects the ejection port on the right side with the exhaust gas outlet 50. This way, in the turbocharger 49, exhaust gas is introduced to the inside of the turbine 49a from the exhaust manifold 44 through the exhaust gas relay pipe 48, thus rotating the turbine 49a as well as the compressor 49b, and is exhausted from the exhaust gas outlet pipe 50 to the exhaust path 28 (see FIG. 2). The exhaust gas relay pipe 48 has its rear side opened and connected with the ejection port of the exhaust manifold 44 through a bellows pipe, while having its front side opened and connected to the inlet port on the rear side of the turbine 49a.

Further, a branching port is provided on the right face side in a midway position of the exhaust gas relay pipe 48, and one end of an exhaust bypass pipe 69 (exhaust bypass passage 18) is connected to this branching port of the exhaust gas relay pipe 48. The other end of the exhaust bypass pipe 69 is connected to a merging port provided at the rear of the exhaust gas outlet pipe 50, and bypasses a part of exhaust gas ejected from the exhaust manifold 44 to the exhaust gas outlet pipe 50 without the turbocharger 49. Further, the exhaust bypass pipe 69 has the exhaust bypass valve V3 in its midway portion, and the flow rate of exhaust gas supplied to the turbine 49a is adjusted by setting the flow rate of the exhaust gas to be bypassed from the exhaust manifold 44 to the exhaust gas outlet pipe 50, according to the opening degree of the exhaust bypass valve V3.

A machine side operation control device 71 configured to control starting up and stopping and the like of the engine device 21 is fixed to the left side face of the intercooler 51 through a supporting stay (support member) 72. The machine side operation control device 71 includes a switch that receives an operation by operating personnel for starting up or stopping the engine device 21, and a display that indicates states of each part of the engine device 21. The speed adjuster 201 is fixed on the front end of the left side face of the cylinder head 26. On the rear end side of the left side face of the cylinder block 25, an engine starting device 75 configured to start the engine device 21 is fixed.

Further, the engine controlling device 73 configured to control operations of each part of the engine device 21 is fixed on the trailing end surface of the cylinder block 25 through a supporting stay (supporting member 74). On the rear end side of the cylinder block 25, there is installed a flywheel 76 connected to the speed reducer 22 to rotate, and the engine controlling device 73 is arranged in an upper part of a flywheel 76. The engine controlling device 73 is electrically connected to sensors (a pressure sensor and a temperature sensor) in each part of the engine device 21 to collect temperature data, pressure data, and the like of each part of the engine device 21, and provides electromagnetic signals to an electromagnetic valve and the like of each part of the engine device 21 to control various operations (fuel oil injection, pilot fuel injection, gas injection, cooling water temperature adjustment, and the like) of the engine device 21.

The cylinder block 25 is provided with a stepwise portion on the upper side of the left side face, and the same number of fuel injection pumps 89 as those of the head covers 40 and the cylinder heads 26 are installed on the top surface of the stepwise portion of the cylinder block 25. The fuel injection pumps 89 are arranged in a single array along the left side face of the cylinder block 25, and their left side faces are connected to the fuel oil pipes (liquid fuel pipes) 42, and their upper ends are connected to the left side face of the cylinder head 26 on the right front, through fuel discharge pipes 90. Of two upper and lower fuel oil pipes 42, one is an oil supply pipe that supplies fuel oil to the fuel injection pump 89, and the other is an oil return pipe that returns the fuel oil from the fuel injection pump 89. Further, the fuel discharge pipes 90 each connects to a main fuel injection valve 79 (see FIG. 6) via a fuel passage in each cylinder head 26 to supply the fuel oil from the fuel injection pump 89 to the main fuel injection valve 79.

The fuel injection pumps 89 are provided in parallel to the array of the head covers 40, in positions at the rear left of the cylinder heads 26 each connected to the fuel discharge pipe 90, on the stepwise portion of the cylinder block 25. Further, the fuel injection pumps 89 are aligned in a single array in position between the cylinder heads 26 and the fuel oil pipes 42. Each fuel injection pump 89 performs an operation of pushing up a plunger by rotation of pump cam on the cam shaft (not shown) in the cylinder block 25. By pushing up the plunger, the fuel injection pump 89 raises the pressure of the fuel oil supplied to the fuel oil pipe 42 to a high pressure, and supplies the high pressure fuel oil in the cylinder head 26 to the fuel injection pump 89 via the fuel discharge pipe 90.

The front end of the common-rail 47 is connected to the ejection side of the pilot fuel pump 54, and the pilot fuel ejected from the pilot fuel pump 54 is supplied to the common-rail 47. Further, the gas manifold 41 extends along the array of the head covers 40 at a height position between the exhaust manifold 44 and the intake manifold 67. The gas manifold 41 includes a gas main pipe 41a extending in the front/rear direction and having its front end connected to a gas inlet pipe 97; and a plurality of gas branch pipes 41b branched off from the upper surface of the gas main pipe 41a towards the cylinder heads 26. The gas main pipe 41a has on its upper surface connection flanges at regular intervals, which are fastened to the inlet side flanges of the gas branch pipes 41b. An end portion of each gas branch pipe 41b on the opposite side to the portion connecting to the gas main pipe 41a is connected to the right side face of a sleeve in which the gas injector 98 is inserted from above.

Figure 13:
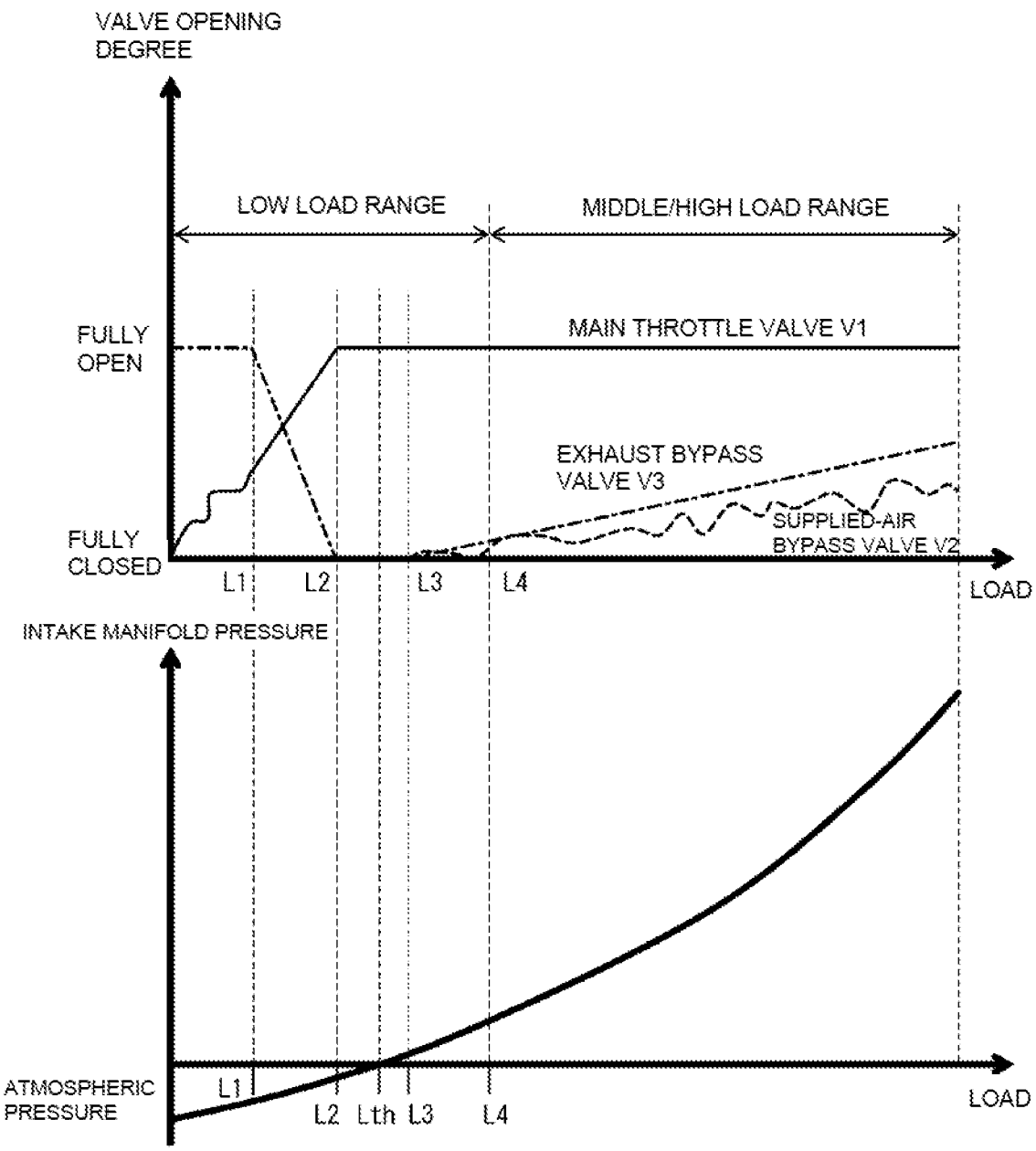
FIG. 13 illustrates a diagram for explaining the air-fuel ratio control with respect to a load when the engine device is operated in the gas mode.

Next, the following describe, with mainly FIG. 13 and the like, an air flow rate control at a time of operating the dual-fuel engine 21 (engine device 21) having the above-described structure in the gas mode.

As shown in FIG. 13, the engine controlling device 73 performs a feedback control (PID control) with respect to the valve opening degree of the main throttle valve V1, when the engine load is in a low load range (load range of not more than load L4) and less than a predetermined load L1. At this time, the engine controlling device 73 sets a target value (target pressure) of the intake manifold pressure according to the engine load. Then, the engine controlling device 73 receives a measurement signal from the pressure sensor 39 and confirms the measured value (measured pressure) of the intake manifold pressure to obtain the difference from the target pressure. This way, based on the difference value between the target pressure and the measured pressure, the engine controlling device 73 executes the PID control of the valve opening degree of the main throttle valve V1 to bring the air pressure of the intake manifold 67 close to the target pressure.

When the engine load is the predetermined load L1 or higher, the engine controlling device 73 performs a map control with respect to the valve opening degree of the main throttle valve V1. At this time, the engine controlling device 73 refers to a data table DT1 storing the valve opening degrees of the main throttle valve V1 relative to the engine loads, and sets a valve opening degree of the main throttle valve V1 corresponding to the engine load. When the engine load is a load L2 (L1<L2<Lth<L4) or higher, the engine controlling device 73 performs control to fully open the main throttle valve V1. It should be noted that the load L2 is in the low load range, and is set to be a lower load than a load Lth at which the intake manifold pressure is the atmospheric pressure.

When the engine load is in the low load range and lower than a predetermined load L3 (Lth<L3<L4), the engine controlling device 73 performs control to fully open the supplied-air bypass valve V2. When the engine load is the predetermined load L3 or higher, the engine controlling device 73 performs feedback control (PID control) with respect to the valve opening degree of the supplied-air bypass valve V2. At this time, based on the difference value between the target pressure according to the engine load and the measured pressure by the pressure sensor 39, the engine controlling device 73 executes the PID control of the valve opening degree of the supplied-air bypass valve V2 to bring the air pressure of the intake manifold 67 close to the target pressure.

The engine controlling device 73 performs map control with respect to the valve opening degree of the exhaust bypass valve V3, throughout the entire range of engine load. At this time, the engine controlling device 73 refers to a data table DT2 storing the valve opening degrees of the exhaust bypass valve V3 relative to the engine loads, and sets a valve opening degree of the exhaust bypass valve V3 corresponding to the engine load. That is, when the engine load is lower than the predetermined load L1, the exhaust bypass valve V3 is fully opened. When the engine load is higher than the predetermined load L1, the opening degree of the exhaust bypass valve V3 is monotonically reduced, and the exhaust bypass valve V3 is fully opened at the predetermined load L2. Then, while the engine load is higher than the predetermined load L2, but not more than the predetermined load L3, the exhaust bypass valve V3 is fully opened. When the engine load is higher than the predetermined load L3 in the low load range, the opening degree of the exhaust bypass valve V3 is monotonically increased with respect to the engine load. That is, the exhaust bypass valve V3 is gradually opened.

As shown in FIG. 13, when the load imposed to the engine (engine load) is in the low load range, and higher than a first predetermined load L3, the engine controlling device 73 controls the opening degree of the main throttle valve V1 to be fully opened. Further, the engine controlling device 73 adjusts the pressure of the intake manifold 67 to a target value according to the load, by performing feedback control (PID control) with respect to the supplied-air bypass valve V2 and by performing map control with respect to the exhaust bypass valve V3. While the load on the engine is the first predetermined load L3, the supplied-air bypass valve V2 and the exhaust bypass valve V3 are fully opened.

In cases of optimizing the turbocharger 49 for a diesel mode specification, the responsiveness of the pressure control for the intake manifold 67 is made suitable even in the gas mode operation, by controlling the opening degree of the supplied-air bypass valve V2 according to fluctuation in the engine load. Therefore, shortage and surplus in the air amount necessary for combustion are prevented at a time of load fluctuation, and the engine device 21 is suitably operated in the gas mode, even if it uses the turbocharger 49 optimized for the diesel mode.

Further, by controlling the opening degree of the exhaust bypass valve V3 according to fluctuation in the engine load, air that matches with the air-fuel ratio required for combustion of the gaseous fuel is supplied to the engine device 21. Further, by performing in combination a control operation by the supplied-air bypass valve V2 with a good responsiveness, the response speed to the load fluctuation during the gas mode can be accelerated. Therefore, knocking due to an insufficient amount of air required for combustion at the time of load fluctuation can be prevented.

Further, when the engine load is in the low load range and is lower than a second predetermined load L1 which is lower than the first predetermined load L3, the feedback control (PID control) is performed with respect to the main throttle valve V1. On the other hand, when the engine load is higher than the second predetermined load L1, the engine controlling device 73 performs the map control based on the data table DT1 with respect to the main throttle valve V1. Further, when the engine load is determined as to be lower than the predetermined load L1, the supplied-air bypass valve V2 is fully opened, and the exhaust bypass valve V3 is fully opened. That is, when the pressure of the exhaust manifold 44 is a negative pressure which is lower than the atmospheric pressure, the exhaust bypass valve V3 is fully opened to stop driving of the turbine 49a, so that surging and the like in the turbocharger 49 can be prevented. Further, by fully opening the supplied-air bypass valve V2, control of the intake manifold pressure by the main throttle valve V1 can be made highly responsive.

Further, when the engine load is the second predetermined load L1 or higher, but lower than the third predetermined load L2 which takes a value between the first and second predetermined loads L3 and L1, the map control based on the data table DT1 is performed with respect to the main throttle valve V1. Further, the supplied-air bypass valve V2 is fully opened, and the exhaust bypass valve V3 is subjected to the map control based on a data table DT2. When the engine load is equal to the first predetermined load L3, the main throttle valve V1 is fully opened, and the supplied-air bypass valve V2 and the exhaust bypass valve V3 are fully opened, thereby enabling switching over from the diesel mode to the gas mode.

Figure 14:
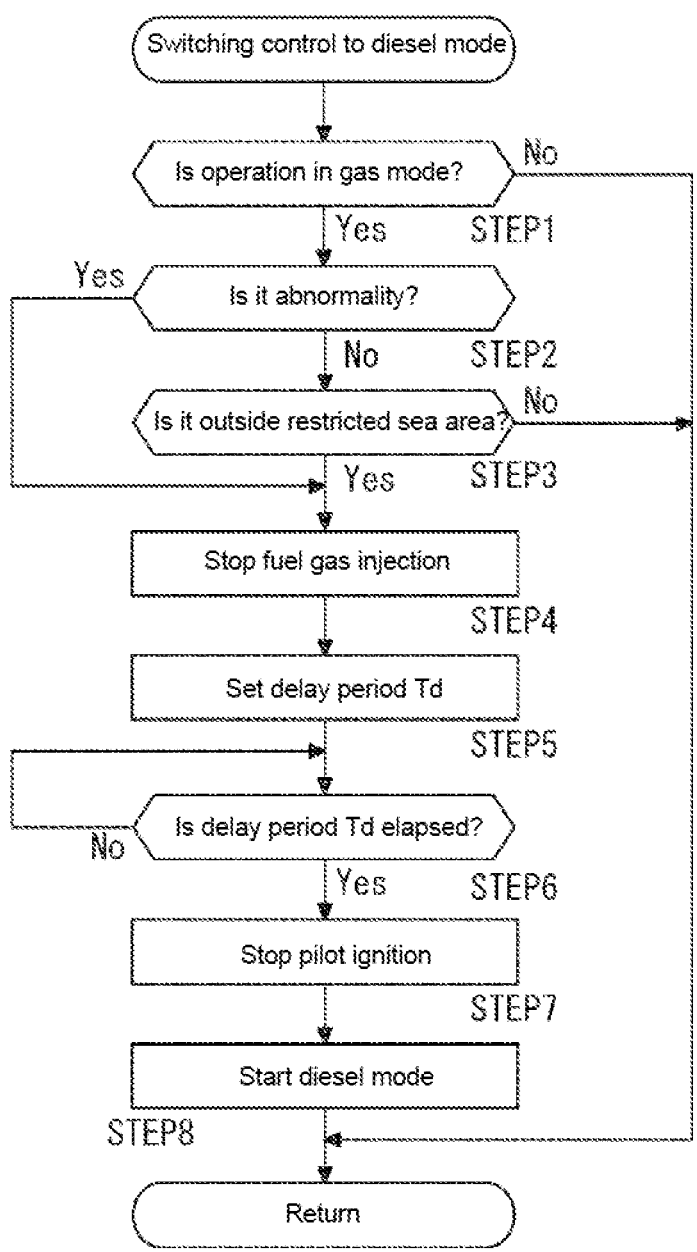
FIG. 14 illustrates a flowchart showing operations in a diesel mode switching control by an engine controlling device.
Figure 15:
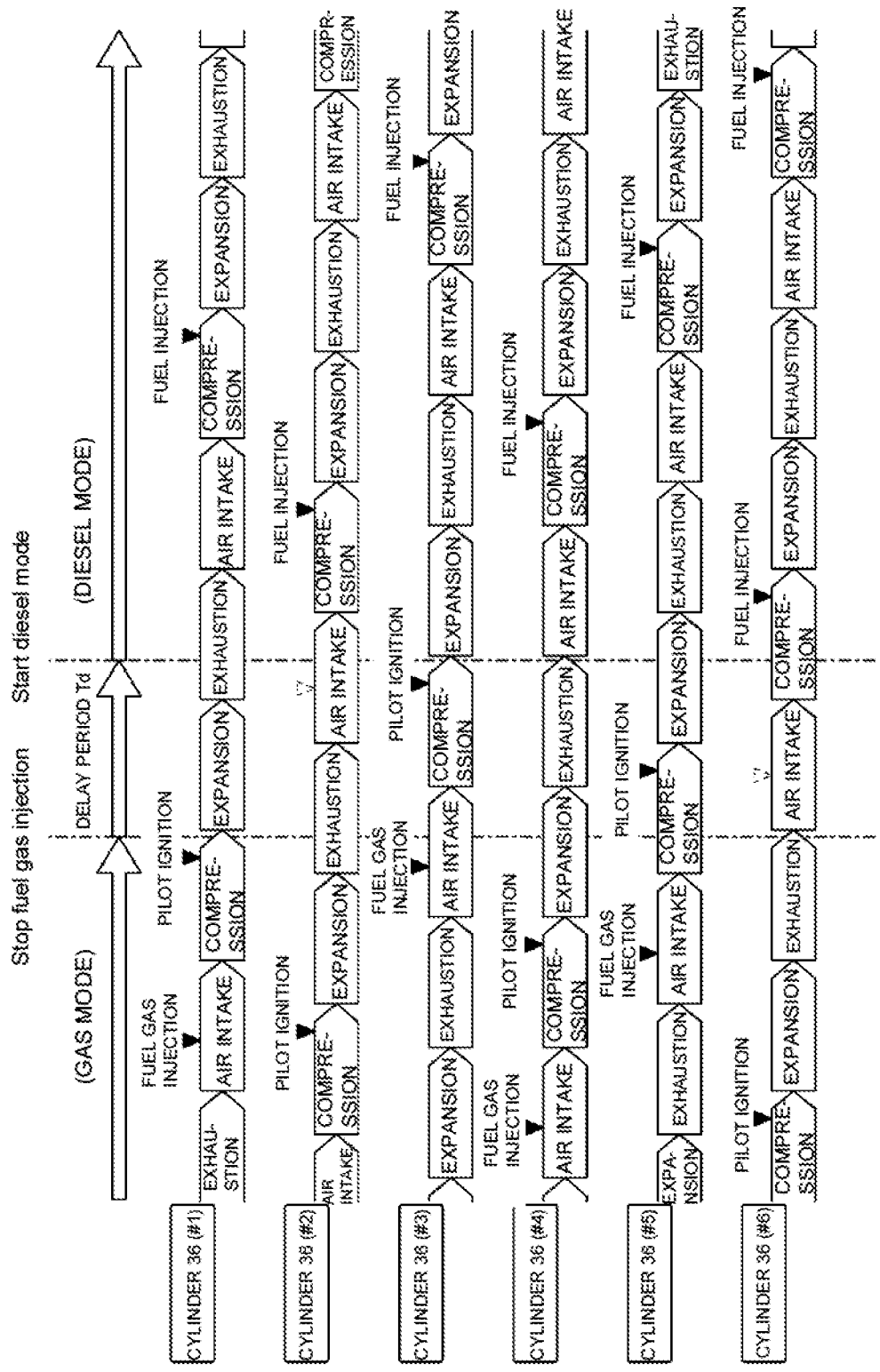
FIG. 15 illustrates a timing chart showing an example of operation states of each cylinder in the engine device, at a time of switching from the gas mode to the diesel mode, based on the diesel mode switching control.

Next, with reference to FIG. 14 and FIG. 15, the following describes control performed when the operation of the engine device 21 operating in the gas mode is switched to the diesel mode. FIG. 14 is a flowchart showing operations performed in switching control to a diesel mode operation.

FIG. 15 is a timing chart showing an example switching operation according to the flowchart of FIG. 14.

As shown in FIG. 14, when the engine controlling device 73, when confirming that the engine device 21 is operating in the gas mode (Yes in STEP 1), checks whether or not an abnormality (e.g., a drop in the fuel gas pressure, a drop in the intake manifold pressure, an increase in the gas temperature, an increase in the air temperature, or disconnection of sensors) is taking place in the gas mode operation of the engine device 21 (STEP 2). If no abnormality is taking place in the gas mode operation (No in STEP 2), if the current location is out of a restricted sea area which restricts emission amounts of NOx (nitrogen oxides) and SOx (sulfur oxides) is confirmed (STEP 3).

When an abnormality is confirmed in the gas mode operation (Yes in STEP 2) or when it is confirmed that the ship 1 has moved outside the restricted sea area based on a restricted sea area information map data (Yes in STEP 3), the engine controlling device 73 stops operation of injecting the fuel gas from the gas injector 98 (STEP 4). That is, the engine controlling device 73 determines that the operation switching from the gas mode to the diesel mode is to be executed when an abnormality takes place in the gas mode operation or when the current location of navigation is detected to be outside the restricted sea area, and stops supply of the fuel gas to the cylinders 36 (cylinders 77). At this point, the gas injectors 98 of the cylinders 36 are all closed, and their opening operations in the air intake stroke are disabled. Further, supply of the fuel gas to the fuel supply path 30 is stopped by the gas valve unit 35.

Next, based on a detection signal from the engine rotation sensor 20, the engine controlling device 73 confirms the engine rotation number of the engine device 21, and calculates a delay period Td which is a period from the stopping of the gas mode operation to the start of the diesel mode operation (STEP 5). The delay period is set longer than a period taken by the compressing stroke, but shorter than a period taken by the air intake stroke and the compressing stroke, based on the engine rotation number confirmed by the engine rotation sensor 20. Further, the delay period Td may be set to be equal to a period set based on the engine rotation number, from the fuel gas injection timing (gas mode) in the air intake stroke of the gas mode to the fuel oil injection timing in the compressing stroke in the diesel mode.

After the setting of the delay period Td, when the elapse of the delay period Td is confirmed (Yes in STEP 6), the engine controlling device 73 stops ignition operation by the pilot fuel injection valve 82 (STEP 7). At this time, the engine controlling device 73 stops supply of the pilot fuel to the pilot fuel injection valve 82 in the cylinder 36, and stops operation in the gas mode. Next, the engine controlling device 73 causes the fuel injection pump 89 to start supply of the fuel oil to the main fuel injection valve 79 (STEP 8). At this time, the engine controlling device 73 drives the speed adjuster 201 to set the rack position of the control rack 202 in the fuel injection pump 89, thereby adjusting the fuel injection amount to the main fuel injection valve 79.

As shown in FIG. 15, the engine controlling device 73, when determining to perform switching to the diesel mode operation during the gas mode operation, stops supply of the fuel gas and then starts supply of the fuel oil after elapse of the delay period Td based on the engine rotation number. That is, in the engine device 21, the start of supplying the fuel oil (start of operation in the diesel mode) is delayed by the delay period Td relative to the stop of supplying the fuel gas (stop of operation in the gas mode), at a time of switching from the gas mode operation to the diesel mode operation.

Therefore, the engine device 21 selectively supplies the fuel gas or the fuel oil to each cylinder 77 (cylinder 36) at the time of switching from the gas mode operation to the diesel mode operation, and can prevent the fuel gas supply and the fuel oil supply from overlapping each other. Therefore, at the time of switching from the gas mode to the diesel mode, there will not be a case where both the fuel gas and the fuel oil are supplied to a single cylinder 36, and it is possible to avoid an excessive supply of the fuel to the cylinder 77, and to prevent an excessively high in-cylinder pressure and abnormal combustion.

The example of FIG. 15 shows the state transitions of cylinders 36 (#1 to #6) in a case where the cylinder 36 (#6) is in the air intake stroke and the operation is switched from the gas mode to the diesel mode after the fuel gas is injected from the gas injector 98. When supply of the fuel gas is stopped (stopping of the gas mode) after injection of the fuel gas in the cylinder 36 (#6), the engine controlling device 73 times the delay period Td, and the pilot fuel is supplied to the pilot fuel injection valve 82 during the delay period Td. Therefore, in the cylinders 36 (#2, #4, #6) in which the fuel gas is supplied into their cylinders 77 before the supply of the fuel gas is stopped, the fuel gas in the cylinders 77 is ignited by the pilot fuel injection valve 82 in the compressing stroke.

Although the cylinder 36 (#5) enters the air intake stroke before the elapse of the delay period Td, no fuel gas will be injected from the gas injector 98 into the cylinder 77 because the supply of the fuel gas is stopped. After that, when the delay period Td elapses, the supply of the pilot fuel is stopped, and supply of the fuel oil is started (starting of the diesel mode). This way, the control valve of the fuel injection pump 89 is opened in the compressing stroke to inject and ignite the fuel oil in the cylinder 77 through the main fuel injection valve 79, sequentially from the cylinder 36 (#5).

Figure 16:
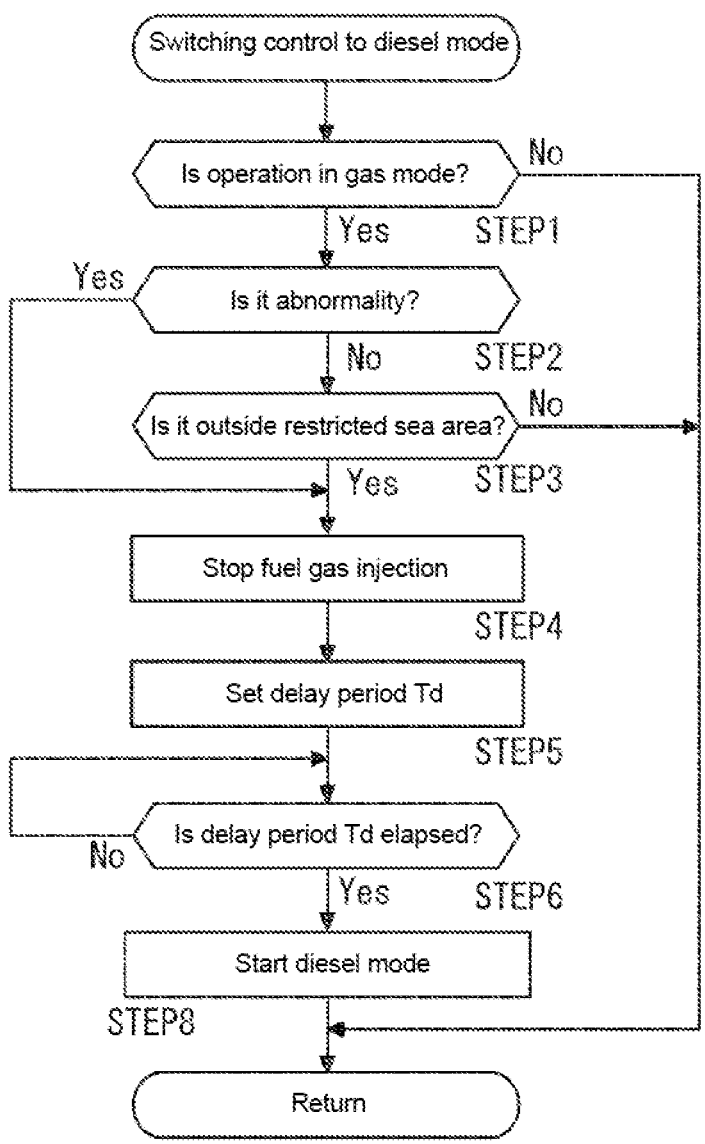
FIG. 16 illustrates a flowchart showing another example of operations in the diesel mode switching control device by the engine controlling device.

It should be noted that the present embodiment deals with a case where the supply of the pilot fuel to the pilot fuel injection valve 82 is stopped at a time of operating in the diesel mode; however, the pilot fuel may always be supplied to the pilot fuel injection valve 82 in both the gas mode and the diesel mode. In this case, as shown in the flowchart of FIG. 16, the engine controlling device 73, after confirming elapse of the delay period Td (Yes in STEP 6), starts the fuel oil supply from the fuel injection pump 89 (STEP 8), while the ignition operation by the pilot fuel injection valve 82 is continued.

Figure 17:
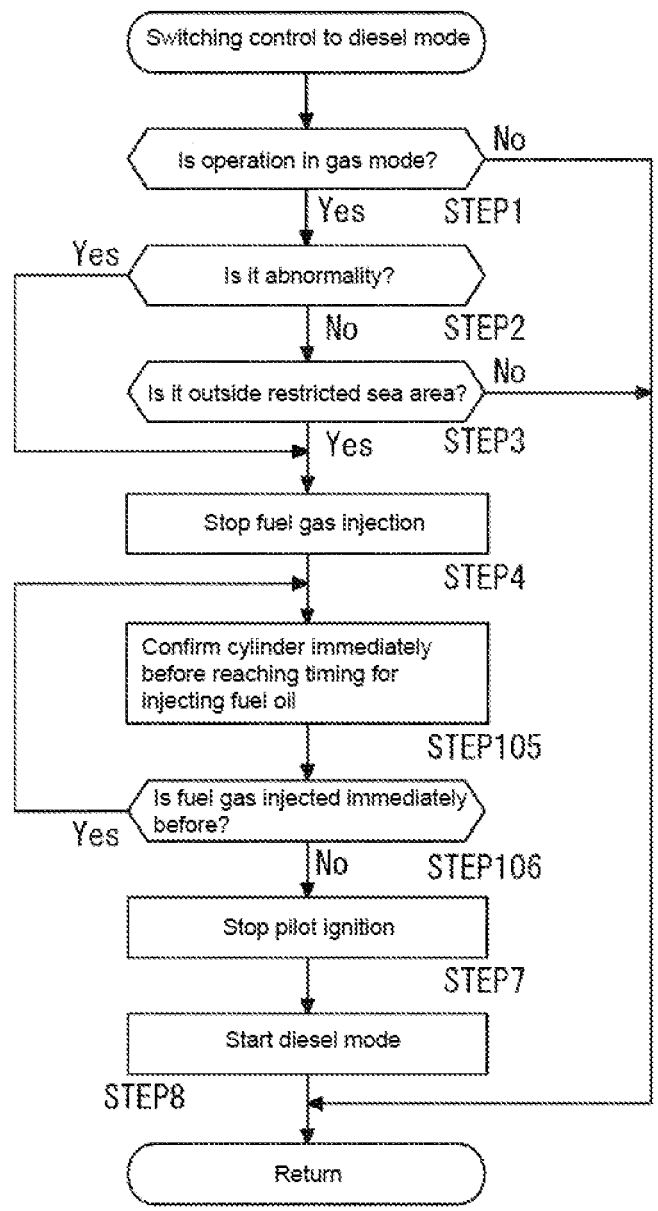
FIG. 17 illustrates a flowchart showing operations in a diesel mode switching control by an engine controlling device of another embodiment.
Figure 18:
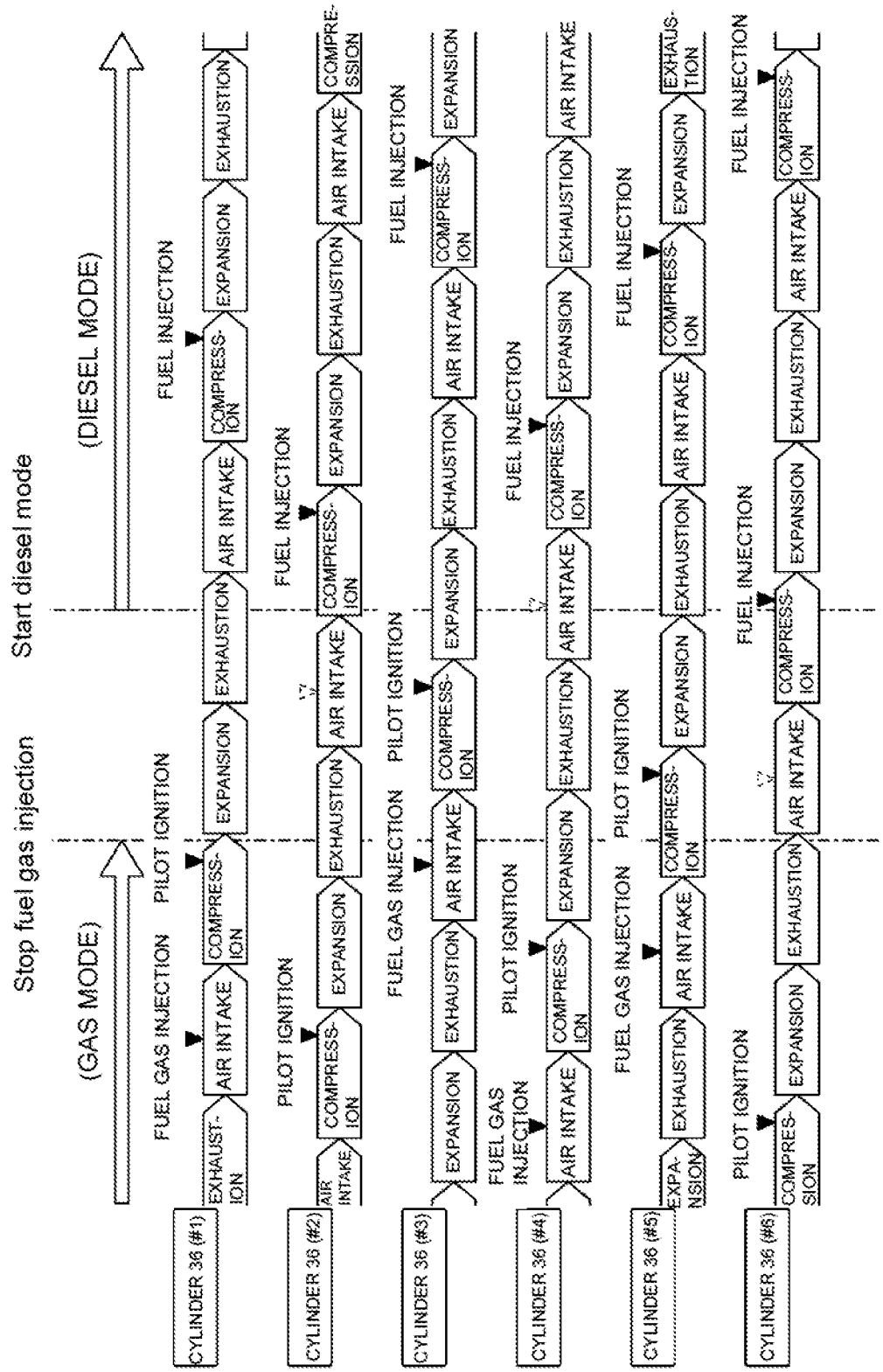
FIG. 18 illustrates a timing chart showing an example of operation states of each cylinder in an engine device, at a time of switching from a gas mode to a diesel mode, based on the diesel mode switching control of the other embodiment.
Figure 19:
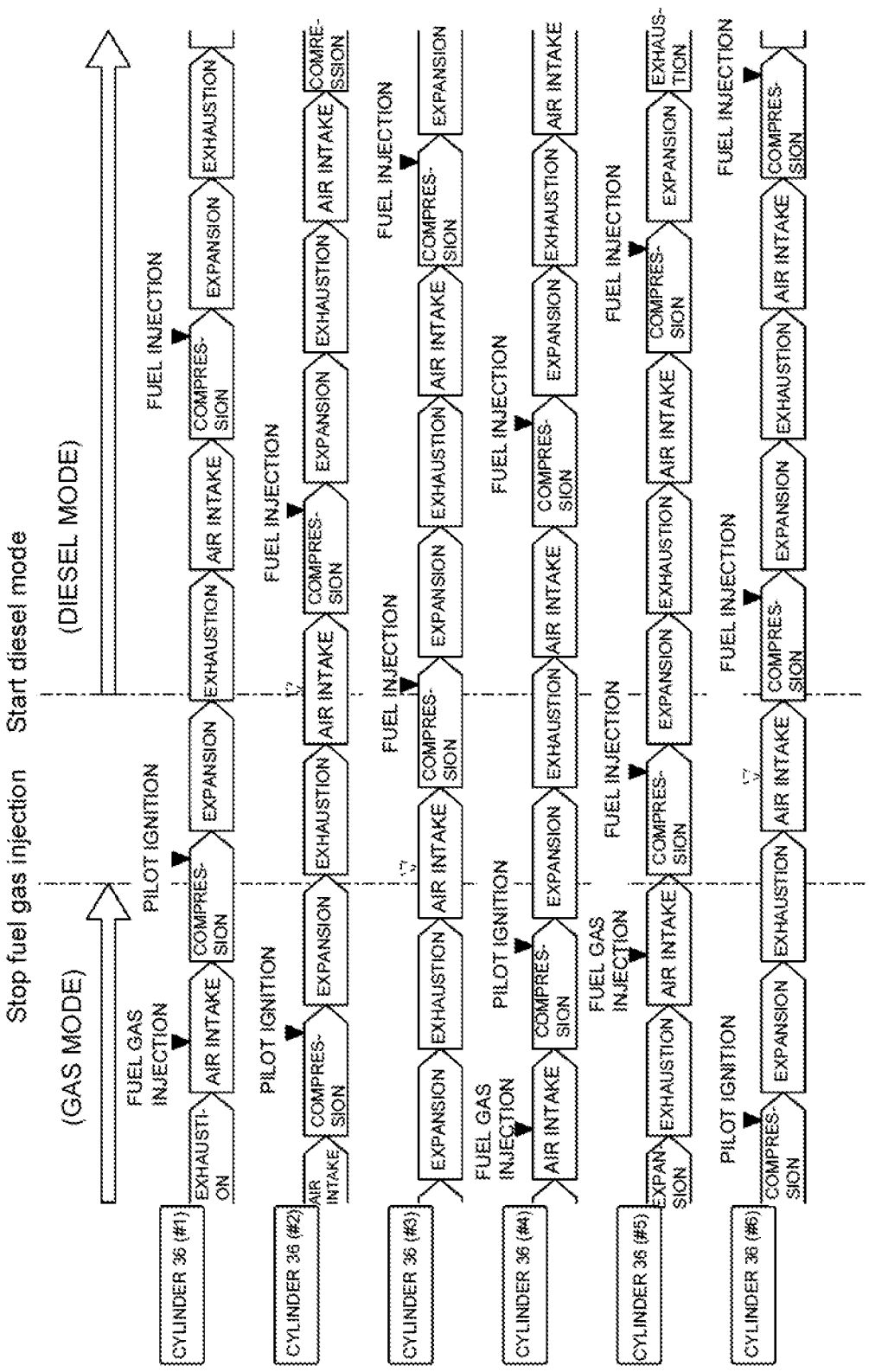
FIG. 19 illustrates a timing chart showing another example of operation states of each cylinder in the engine device, at a time of switching from the gas mode to the diesel mode, based on the diesel mode switching control of the other embodiment.

With reference to FIG. 17 to FIG. 19, the following describes control operations for switching from the gas mode operation to the diesel mode operation in an engine device of another embodiment (second embodiment) which is different from the above-described embodiment (first embodiment). FIG. 17 is a flowchart showing operations performed in switching control to the diesel mode operation. FIG. 18 and FIG. 19 are each a timing chart showing an example switching operation according to the flowchart of FIG. 17. It should be noted that the present embodiment deals with a case where the supply of the pilot fuel to the pilot fuel injection valve 82 is stopped in the diesel mode, as in the first embodiment; however, the pilot fuel may always be supplied to the pilot fuel injection valve 82 in both the gas mode and the diesel mode.

As shown in FIG. 17, in the engine device 21 of the second embodiment, when the engine controlling device 73, during the gas mode operation (Yes in STEP 1), confirms an abnormality in the engine operation or the current location being outside the restricted sea area (Yes in STEP 2 or STEP 3), injection of the fuel gas from the gas injector 98 is stopped (STEP 4). That is, the engine controlling device 73 determines that the operation switching from the gas mode to the diesel mode is to be executed, and stops supply of the fuel gas to the cylinders 36 (cylinders 77).

Next, when the engine controlling device 73 confirms the cylinder 36 immediately before reaching the timing for injecting the fuel oil in the compressing stroke (STEP 105), and then confirms whether or not the fuel gas has been injected to that cylinder 36 in the immediately previous air intake stroke (STEP 106). At this time, in the cylinder 36 immediately before reaching the timing for injecting the fuel oil, if the fuel gas has been injected in the immediately previous air intake stroke (Yes in STEP 106), the engine controlling device 73 determines that the fuel gas has been supplied to the cylinder 77 before the gas mode is stopped. Therefore, the engine controlling device 73 does not enable transition to the diesel mode operation, and executes ignition by the pilot fuel injection valve 82 to combust the fuel gas in the cylinder 77.

As described above, the engine controlling device 73 confirms whether or not the fuel gas has been injected in the immediately previous air intake stroke, sequentially for the cylinders 36 immediately before reaching the timing for injecting the fuel oil in the compressing stroke (STEP 105 to STEP 106). Then, when it is confirmed that no fuel gas has been injected in the immediately previous air intake stroke, in the cylinder 36 immediately before reaching the timing for injection of the fuel oil in the compressing stroke (No in STEP 106), the ignition operation by the pilot fuel injection valve 82 is stopped (STEP 7), and supply of the fuel oil to the main fuel injection valve 79 by the fuel injection pump 89 is started (STEP 8).

As shown in FIG. 18 and FIG. 19, the engine controlling device 73, when determining to perform switching to the diesel mode during the gas mode operation, starts supply of the fuel oil only when it confirms that no fuel gas has been injected in the immediately previous air intake stroke in the cylinder 36 to reach a predetermined timing (before reaching the fuel oil injection timing) in the compressing stroke. In other words, at a time of switching from the gas mode operation to the diesel mode operation, the engine device 21 stops the gas mode operation, and then starts the diesel mode operation when the cylinder 36 in which the supply of fuel gas in the air intake stroke is stopped approaches the fuel oil injection timing.

The engine device 21 enables the fuel oil supply to start the diesel mode, when a cylinder 36 having reached the fuel oil injection timing and having no fuel gas supplied in the cylinder 77 is confirmed for the first time after the fuel gas supply is stopped. Thus, at a time of switching from the gas mode to the diesel mode, the fuel gas or the fuel oil can be selectively supplied to each cylinder 77 (cylinder 36), while the time for switching over is minimized. Therefore, at the time of switching from the gas mode to the diesel mode, the fuel gas supply and the fuel oil supply are not performed to a single cylinder 36 in an overlapping manner, and it is possible to avoid an excessive supply of the fuel to the cylinder 77, and to prevent an excessively high in-cylinder pressure and abnormal combustion. Further, since it is possible to avoid a situation in which neither the fuel gas nor the fuel oil is supplied to the cylinder 77 at a time of switching from the gas mode to the diesel mode, misfire at the time of switching can be prevented.

The example of FIG. 18 shows the state transitions of cylinders 36 (#1 to #6) in a case where the cylinder 36 (#3) is in the air intake stroke and the operation is switched from the gas mode to the diesel mode after the fuel gas is injected from the gas injector 98. When the supply of the fuel gas is stopped (stopping of the gas mode) after the injection of the fuel gas in the cylinder 36 (#3), the engine controlling device 73 recognizes the cylinder 36 (#5) in the compressing stroke, and confirms whether or not fuel gas injection from the gas injector 98 has been performed in the cylinder 36 (#5) in the immediately previous air intake stroke. At this time, the fuel gas has been injected to the cylinder 36 (#5) in the air intake stroke, the engine controlling device 73 ignite the fuel gas in the cylinder 77 by the pilot fuel injection valve 82, without enabling the injection of the fuel oil. Next, the engine controlling device 73 keeps the injection of the fuel oil disabled, also for the cylinder 36 (#3) which is to enter the compressing stroke subsequently to the cylinder 36 (#5), because the fuel gas has been injected immediately before.

After that, for the cylinder 36 (#6) which enters the compressing stroke subsequently to the cylinder 36 (#3), the engine controlling device 73 confirms whether or not the fuel gas has been injected from the gas injector 98 in the immediately previous air intake stroke. In this case, since the fuel gas has not yet been injected to the cylinder 36 (#6) in the air intake stroke, the engine controlling device 73 stops supplying of the pilot fuel and starts supplying of the fuel oil (start of diesel mode). This way, the control valve of the fuel injection pump 89 is opened in the compressing stroke to inject and ignite the fuel oil in the cylinder 77 through the main fuel injection valve 79, sequentially from the cylinder 36 (#6).

The example of FIG. 19 shows the state transitions of cylinders 36 (#1 to #6) in a case where the cylinder 36 (#3) is in the air intake stroke and the operation is switched from the gas mode to the diesel mode before the fuel gas is injected from the gas injector 98. When the supply of the fuel gas is stopped (stopping of the gas mode) before the injection of the fuel gas after the cylinder 36 (#3) enters the air intake stroke, the engine controlling device 73 recognizes the cylinder 36 (#1) in the compressing stroke, and confirms whether or not fuel gas injection from the gas injector 98 has been performed in the cylinder 36 (#1) in the immediately previous air intake stroke. At this time, the fuel gas has been injected to the cylinder 36 (#1) in the air intake stroke, the engine controlling device 73 ignite the fuel gas in the cylinder 77 by the pilot fuel injection valve 82, without enabling the injection of the fuel oil. Next, the engine controlling device 73 keeps the injection of the fuel oil disabled, also for the cylinder 36 (#5) which is to enter the compressing stroke subsequently to the cylinder 36 (#1), because the fuel gas has been injected immediately before.

After that, for the cylinder 36 (#3) which enters the compressing stroke subsequently to the cylinder 36 (#5), the engine controlling device 73 confirms whether or not the fuel gas has been injected from the gas injector 98 in the immediately previous air intake stroke. In this case, since the fuel gas has not yet been injected to the cylinder 36 (#3) in the air intake stroke, the engine controlling device 73 stops supplying of the pilot fuel and starts supplying of the fuel oil (start of diesel mode). This way, the control valve of the fuel injection pump 89 is opened in the compressing stroke to inject and ignite the fuel oil in the cylinder 77 through the main fuel injection valve 79, sequentially from the cylinder 36 (#3).

The structure of each of the portions is not limited to the illustrated embodiment, but can be variously changed within a scope which does not deflect from the scope of the present invention. Further, the engine device of the present embodiment can also be applied to structures other than the propulsion/electric power generating mechanism described above, such as a generator device for supplying electric power to an electric system in a ship hull and a structure as a drive source in the land-based power generating facility. Further, in the engine device of the present invention, although the ignition method is based on the micro pilot injection method, it may be configured to perform spark ignition in the sub chamber.

REFERENCE SIGNS LIST 1, ship
2, ship hull
4, funnel
5, propeller
9, propeller shaft
11, engine room
12, propulsion/electric power generating mechanism
17, supplied-air bypass passage
18, exhaust bypass passage
19, load measuring device
20, engine rotation sensor
21, engine device (dual-fuel engine)
22, speed reducer
23, shaft-driven generator
24, output shaft (crank shaft)
25, cylinder block
26, cylinder head
36, cylinder
37, intake port
38, exhaust port
39, pressure sensor
40, head cover
41, gas manifold (gaseous fuel pipe)
42, fuel oil pipe (liquid fuel pipe)
43, side cover
44, exhaust manifold
45, thermal insulation cover
46, cooling water pipe
47, common-rail (pilot fuel pipe)
48, exhaust gas relay pipe
49, turbocharger
51, intercooler
53, cooling water pump
54, pilot fuel pump
55, lubricating oil pump
56, fuel oil pump
57, oil pan
58, lubricating oil cooler
59, lubricating oil strainer
67, intake manifold
79, main fuel injection valve
80, intake valve
81, exhaust valve
82, pilot fuel injection valve
89, combustion injection pump
98, gas injector

The invention claimed is:
1. An engine on a ship, the engine configured to:
based on the ship being within a reduced emissions area, prohibit an engine switching operation to switch operation of the engine from a gas mode to a diesel mode.
2. The engine of claim 1, wherein:
the engine is further configured to operate in each of a plurality of modes;
the plurality of modes include:
the gas mode in which a gaseous fuel is supplied to a cylinder of the engine; and the diesel mode in which a liquid fuel is supplied into the cylinder.

3. The engine of claim 2, further comprising:
an intake manifold configured to supply air to the cylinder of the engine;
an exhaust manifold configured to output exhaust gas from the cylinder;
a gas injector configured to mix the gaseous fuel with the air supplied form the intake manifold; and
a main fuel injection valve configured to inject the liquid fuel into the cylinder for combustion.

* * * * *